US010334406B2

(12) United States Patent
Wang et al.

(10) Patent No.: US 10,334,406 B2
(45) Date of Patent: Jun. 25, 2019

(54) METHODS AND APPARATUS FOR ANALYZING AND GROUPING SERVICE LAYER SUBSCRIPTIONS AND NOTIFICATIONS FOR ENHANCED EFFICIENCY

(71) Applicant: Convida Wireless, LLC, Wilmington, DE (US)

(72) Inventors: Chonggang Wang, Princeton, NJ (US); Guang Lu, Thornhill (CA); Lijun Dong, San Diego, CA (US); Qing Li, Princeton Junction, NJ (US); Catalina M. Mladin, Hatboro, PA (US); Hongkun Li, Malvern, PA (US); Rocco Di Girolamo, Laval (CA)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 15/574,887

(22) PCT Filed: May 20, 2016

(86) PCT No.: PCT/US2016/033480
§ 371 (c)(1),
(2) Date: Nov. 17, 2017

(87) PCT Pub. No.: WO2016/187515
PCT Pub. Date: Nov. 24, 2016

(65) Prior Publication Data
US 2018/0167785 A1 Jun. 14, 2018

Related U.S. Application Data

(60) Provisional application No. 62/164,146, filed on May 20, 2015.

(51) Int. Cl.
H04W 4/06 (2009.01)
H04W 8/18 (2009.01)
(Continued)

(52) U.S. Cl.
CPC ............ H04W 4/06 (2013.01); H04L 67/2833 (2013.01); H04W 4/70 (2018.02); H04W 8/18 (2013.01)

(58) Field of Classification Search
CPC ...... H04L 67/2833; H04W 4/06; H04W 4/70; H04W 8/18
(Continued)

(56) References Cited

U.S. PATENT DOCUMENTS 6,442,565 B1 * 8/2002 Tyra ..................... G06F 9/542
2004/0024855 A1 * 2/2004 Tsai ..................... H04L 41/00
709/223
(Continued)

FOREIGN PATENT DOCUMENTS

WO 2006/111015 A1 10/2006

OTHER PUBLICATIONS

OneM2M-TS-0007-V0.2.0., OneM2M Service Component Architecture, May 15, 2014, 47 pages.
(Continued)

Primary Examiner — Tan H Trinh
(74) Attorney, Agent, or Firm — BakerHostetler

(57) ABSTRACT

A subscription analyzing and grouping mechanism can group similar subscription requests from different subscribers and generates an aggregated notification for them. The subscription analyzing and grouping mechanism reduces the number of subscription request messages and notification messages and in turn improves subscription efficiency and makes M2M/IoT service layer more efficient and scalable.

22 Claims, 26 Drawing Sheets

(51) Int. Cl.
*H04L 29/08* (2006.01)
*H04W 4/70* (2018.01)

(58) Field of Classification Search
USPC ......... 455/3.01, 435, 458, 509, 412, 414.1, 455/414.3, 455; 709/204, 219, 220, 224, 709/223, 217; 370/328; 707/102, 103
See application file for complete search history.

(56) References Cited

U.S. PATENT DOCUMENTS

| | | | | |
|---|---|---|---|---|
| 2004/0230973 | A1* | 11/2004 | Cundiff, Jr. | G06F 9/5027 718/1 |
| 2005/0267969 | A1* | 12/2005 | Poikselka | H04L 65/4061 709/225 |
| 2008/0082654 | A1* | 4/2008 | Tambascio | G05B 23/027 709/224 |
| 2010/0036941 | A1* | 2/2010 | Rahman | H04L 12/2827 709/224 |
| 2011/0214051 | A1* | 9/2011 | Petronijevic | G06F 16/84 715/255 |
| 2012/0011242 | A1* | 1/2012 | Suchter | G06F 11/3006 709/224 |
| 2012/0197990 | A1* | 8/2012 | Li | H04L 51/066 709/204 |
| 2012/0331047 | A1* | 12/2012 | Sana | H04L 67/26 709/203 |
| 2013/0066965 | A1* | 3/2013 | Foti | H04L 67/24 709/204 |
| 2013/0262576 | A1* | 10/2013 | Foti | G06F 9/542 709/204 |
| 2013/0311618 | A1* | 11/2013 | Ruetschi | H04L 67/10 709/219 |
| 2013/0336222 | A1* | 12/2013 | Lu | H04W 4/70 370/328 |
| 2014/0089485 | A1* | 3/2014 | Boberg | H04W 8/245 709/223 |
| 2014/0095707 | A1* | 4/2014 | He | H04L 45/125 709/224 |
| 2014/0221032 | A1* | 8/2014 | Yang | H04W 4/70 455/509 |
| 2015/0055557 | A1* | 2/2015 | Dong | H04W 4/70 370/328 |
| 2015/0245161 | A1* | 8/2015 | Pareglio | H04W 4/005 455/435.1 |
| 2016/0191340 | A1* | 6/2016 | Anakkot | H04L 67/24 709/223 |
| 2016/0219125 | A1* | 7/2016 | Xiao | H04W 4/70 |
| 2016/0234691 | A1* | 8/2016 | Jeong | H04W 4/70 |
| 2016/0302069 | A1* | 10/2016 | Kim | H04L 9/32 |
| 2016/0302085 | A1* | 10/2016 | Park | H04L 67/303 |
| 2016/0337464 | A1* | 11/2016 | Eriksson | H04L 67/2842 |
| 2017/0134523 | A1* | 5/2017 | Wu | H04W 4/70 |
| 2017/0238279 | A1* | 8/2017 | Jeong | H04W 68/00 455/458 |
| 2017/0303065 | A1* | 10/2017 | Li | H04W 4/70 |
| 2018/0199234 | A1* | 7/2018 | Xiao | H04W 4/12 |
| 2018/0249301 | A1* | 8/2018 | Jeong | H04W 4/00 |

OTHER PUBLICATIONS

OneM2M-TS-0001-V1.6.1., OneM2M Functional Architecture, Jan. 30, 2015, 321 pages.

* cited by examiner

METHODS AND APPARATUS FOR ANALYZING AND GROUPING SERVICE LAYER SUBSCRIPTIONS AND NOTIFICATIONS FOR ENHANCED EFFICIENCY

CROSS-REFERENCE TO RELATED APPLICATIONS

This Application is a National Stage Application filed under 35 U.S.C. § 371 of International Application No. PCT/US2016/033480 filed May 20, 2016, which claims the benefit of U.S. Provisional Patent Application Ser. No. 62/164,146, filed May 20, 2015, the disclosure of which is hereby incorporated by reference as if set forth in its entirety.

BACKGROUND

From a protocol stack perspective, service layers 102 are typically situated above the application protocol layer 104 and provide value added services to applications 106. Hence service layers 102 are often categorized as 'middleware' services. For example, FIG. 1 shows an exemplary service layer 102 between an IP network stack and applications 106.

An M2M service layer 102 is an example of one type of service layer specifically targeted towards providing value-added services for M2M-type devices and applications. Recently, several industry standards bodies (e.g., oneM2M described in oneM2M-TS-0001, oneM2M Functional Architecture-V-1.6.1.) have been developing M2M service layers to address the challenges associated with the integration of M2M types of devices and applications into deployments such as the Internet/Web, cellular, enterprise, and home network.

An M2M service layer can provide applications and devices access to a collection of M2M-oriented capabilities supported by the service layer. A few examples include security, charging, data management, device management, discovery, provisioning, and connectivity management. These capabilities are made available to applications via Application Programming Interfaces (APIs) which make use of message formats, resource structures, resource representations, and function calls as defined by the M2M service layer. For example, an M2M service layer may maintain massive M2M data, which can be retrieved or subscribed by M2M applications based on their access rights. Subscription-based data access could be more efficient than retrieval-based data access since it does not introduce any message to M2M application until desired changes to the subscribed resource take place, although the cost is that M2M applications needs to make subscription first before they can receive automatic notifications from the M2M service layer.

oneM2M is a new standard to develop technical specifications which address the need for a common M2M Service Layer that can be readily embedded within various hardware and software, and relied upon to connect a wide variety of devices in the field with M2M application servers worldwide.

The oneM2M common services layer supports a set of Common Service Functions (CSFs) (i.e. service capabilities), as shown in FIG. 2. An instantiation of a set of one or more particular types of CSFs is referred to as a Common Services Entity (CSE) 202 which can be hosted on different types of network nodes (e.g. infrastructure node, middle node, application-specific node).

oneM2M is developing the service layer in two architectural approaches, called Resource Oriented Architecture 300 (ROA) shown in FIG. 3 and Service Oriented Architecture 400 (SOA) shown in FIG. 4.

In ROA architecture 300, a resource is a uniquely addressable element in the architecture having a representation that can be manipulated via RESTful methods such as Create, Retrieve, Update, and Delete. These resources are made addressable using a Uniform Resource Identifiers (URIs). A resource may contain child resource(s) and attribute(s). A child resource is a resource that has a containment relationship with a parent resource. The parent resource representation contains references to its child resources(s). The lifetime of a child-resource is limited by the parent's resource lifetime. Each resource supports a set of "attributes" that store information of the resource.

A CSE can register to another CSE. For example, an M2M gateway (i.e. MN-CSE) registers itself to an M2M server (e.g. IN-CSE) and the M2M server becomes the registrar CSE of the M2M gateway. Likewise, when an IN-AE registers to an IN-CSE, the IN-CSE is referred to as the registrar CSE of the IN-AE.

The SOA architecture 400 (such as that described in oneM2M-TS-0007, Service Component Architecture-V-0.7.0.) is being developed to consider legacy deployment that is not RESTful based. It re-uses largely the same service layer functional architecture. The service layer contains various M2M services, and multiple services can be grouped into service components. In addition to existing reference points, it introduced the inter-service reference point Msc. Communication between M2M Service Components which pass over the Msc reference point utilizes a web services approach, e.g., Web Services Message Exchange Patterns (MEP).

oneM2M functional architecture defines a set of CSFs which can be provided by a CSE such as an M2M server to other CSEs or AEs. One CSF is Subscription and Notification (SUB) which provides notifications pertaining to a subscription that tracks changes on a resource (e.g. deletion of a resource).

The SUB CSF manages subscriptions to resources, subject to access control policies, and sends corresponding notifications to the address(es) where the resource subscribers want to receive them. An AE or a CSE is the subscription resource subscriber. AEs and CSEs subscribe to resources of other CSEs. A subscription Hosting CSE sends notifications to the address(es) specified by the resource subscriber when modifications to a resource are made. The scope of a resource subscription includes tracking changes and operations of attribute(s) and direct child resource(s) of the subscribed-to resource. Each subscription may include notification policies that specify which, when, and how notifications are sent.

The SUB CSF supports the inclusion of the resource subscriber ID, the hosting CSE-ID and subscribed-to resource address(es) per resource subscription request. It may also include other criteria (e.g. resource modifications of interest and notification policy) and the address(es) where to send the notifications.

The SUB CSF also supports the ability to subscribe to a single resource via a single subscription, or subscribe to multiple resources via a single subscription when they are grouped and represented as a single group resource In oneM2M, subscribers could be AE(s) or CSE(s), while hosting node(s) or transit node(s) has to be CSE(s). For example, an IN-AE as a subscriber could make subscription to resources hosted by an IN-CSE (i.e. hosting node). In another example, an MN-CSE has some resources which an IN-AE as a subscriber wants to subscribe; but the IN-AE's subscription request must go through its IN-CSE (i.e. transit node) to reach the MN-CSE.

FIG. 5 illustrates an example procedure according to oneM2M specification, where an IN-AE1 as a subscriber make a subscription to a resource on an IN-CSE (i.e. <subscribed-to-resource>). To do that, the IN-AE1 issues a CREATE request to create a <subscription> resource under <subscribed-to-resource> (i.e. Step 1 of FIG. 5); the IN-AE1 can indicate eventNotificationCriteria and multiple notificationURIs in this step. The eventNotificationCriteria shows which events about <subscribed-to-resource> the IN-AE1 is interested. The notification can be sent to the subscriber (i.e. IN-AE1) and/or the notification receiver as indicated by notificationURI (i.e. notificationURI1 for the subscriber and notificationURI2 for another notification receiver in this example). The IN-CSE as hosting CSE will first create a <subscription> as sub-resource of <subscribed-to-resource> after receiving the subscription request from Step 1 of FIG. 5. After that, when an event occurs and meets eventNotificationCriteria as contained in Step 1, the IN-CSE will automatically send two notifications, respectively to the subscriber and the notification receiver indicated by notificationURI1 and notificationURI2 (i.e. Step 5 and Step 6 of FIG. 5). Please note that the notification receiver may be the subscriber itself if the notificationURI in Step 1 contains its URI. In addition, the subscription request in Step 1 of FIG. 5 could contain multiple notificationURIs, which means the Subscriber request future notifications to be sent to multiple notification receivers, but the eventNotificationCriteria is the same and applies to all notificationURIs. It's not shown in the figure but oneM2M supports that the hosting CSE performs batch notifications, where it the hosting CSE can send multiple notifications to the same notificationURIs in one message.

According to the oneM2M specification, the hosting node needs to generate multiple notifications if the subscriber indicates multiple notificationURIs in its subscription request. Moreover, if multiple subscribers are interested in the same resource, they need to make separate subscription requests and the hosting CSE will have to send a separate notification to each subscriber or the designated notification receiver. In addition, oneM2M does not support any function to analyze and/or leverage potential relationships among different subscription requests.

According to the oneM2M functional architecture, "A resource can be announced to one or more remote CSEs to inform the remote CSEs of the existence of the original resource. An announced resource can have a limited set of attributes and a limited set of child resources from the original resource. The announced resource includes a link to the original resource hosted by the original resource-Hosting CSE." For example, an MN-CSE (e.g. an M2M Gateway) registers with an IN-CSE (e.g. an M2M Server) and it can announce its local resources to the IN-CSE. The announced resource can be used to facilitate and expedite resource discovery.

oneM2M functional architecture also specifies:
"Synchronization between the attributes announced by the original resource and the announced resource is the responsibility of the original resource Hosting CSE."
"The announced attributes shall have the same value as the original resource, and synchronization between the value of the announced attributes at the original resource and the announced resource is the responsibility of the original resource Hosting CSE."

But oneM2M does not give details on how such synchronization should be performed between the Hosting CSE and the remote CSE. Such synchronization could be very frequent and causes high overhead if the value of resource attributes changes quickly. For example, a cellular-based M2M Device with an integrated motion sensor announces the motion sensor readings to its registrar CSE (i.e. an M2M Server) in the cloud. Since the motion sensor readings could change fast, to maintain the synchronization between the original motion sensor readings and the announced motion sensor readings will cause high communication overhead between the M2M Device and the M2M Server, which may become even unaffordable because of the limited bandwidth provided by the cellular connection.

SUMMARY oneM2M provides subscription mechanism for accessing data or resource maintained by a hosting node (e.g. an M2M server). Basically, a resource on the hosting node can be subscribed by various subscribers (e.g. M2M network applications). When the resource changes its value for example and meets event notification criteria of a subscriber, the hosting node will send an automatic notification to the subscriber. When multiple subscribers are interested in the same resource and events, they first need to send multiple and separate subscription requests to the host node according to oneM2M specification. As a result, the host node needs to send multiple identical notifications to those subscribers. Such subscription operations are inefficient since those multiple subscription requests and corresponding notifications are identical and cause overhead.

To solve this issue, this disclosure proposes subscription analyzing and grouping mechanism which can group similar subscription requests from different subscribers and generates an aggregated notification for them. The proposed subscription analyzing and grouping mechanism reduces the number of subscription request messages and notification messages and in turn improves subscription efficiency and makes M2M/IoT service layer more efficient and scalable. Specifically, the following ideas are proposed:

New subscription analyzing and grouping architecture (A) where the hosting node analyzes subscription requests from various subscribers and groups them to different subscription groups. Then the hosting node sends an aggregated notification for each subscription group to the transit node, where notification distribution is conducted and separate notifications will be sent to original subscribers or designated notification receivers.

New subscription analyzing and grouping architecture (B) where subscription analyzing/grouping and notification distribution are both performed at transit nodes. The first transit node (e.g. registrar CSE of subscribers) receives subscription requests from different subscribers and aggregates them if meeting certain criteria. The first transit node then sends an aggregated subscription request to the hosting node. When the resource has changes, the hosting node sends an aggregated notification to the second transit node which provides notification distribution service and will distribute the notification to subscribers. The subscribers or the first transit may indicate the address of the second transit node in their subscription request.

New Subscription Analyzing and Grouping Service (SAGS 1002) which is responsible for aggregating similar subscription requests, configuring Notification Distribution Service (NODS 1004) with a list of notificationURIs, and sending aggregated notifications to Notification Distribution Service (NODS 1004).

New Notification Distribution Service (NODS 1004) which receives NODS 1004 configuration and aggregated notifications from SAGS 1002. It then distributes the aggregated notification to original subscribers.

New procedures are described for subscription aggregation at the hosting node to implement the proposed architecture A.

New procedures are described for subscription aggregation at the transit node to implement the proposed architecture B.

New procedures are described for making subscription to original resource indirectly via its announced resource. In this case, subscribers send subscription requests to announced resources maintained by a transit node. The transit node will then aggregate those requests and sends an aggregated request to the hosting node where original resources reside. When original resources have changes, the hosting node sends an aggregated notification to the transit node which will distribute the notification to subscribers.

New resources and attributes as embodiments to implement the proposed ideas in oneM2M ROA architecture.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein.

DETAILED DESCRIPTION OF ILLUSTRATIVE EMBODIMENTS

Figure 1:
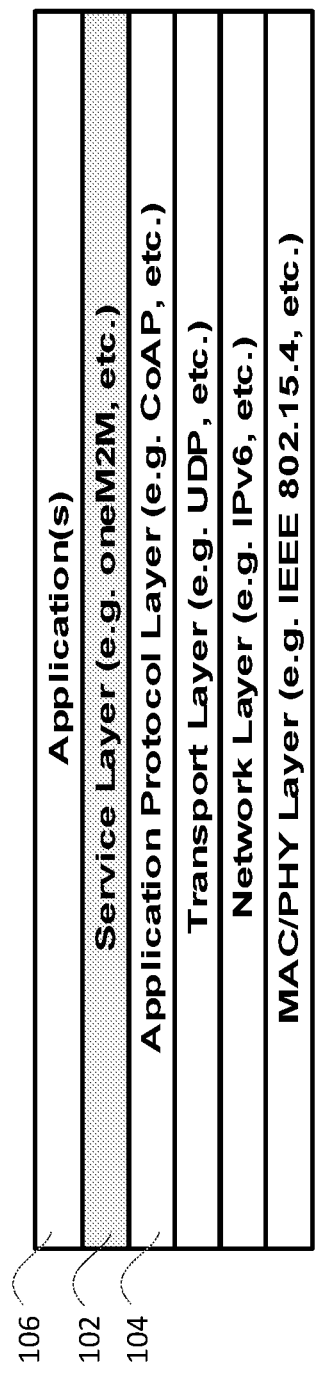
FIG. 1 is a diagram of an Exemplary Protocol Stack Supporting a Service Layer.
Figure 2:
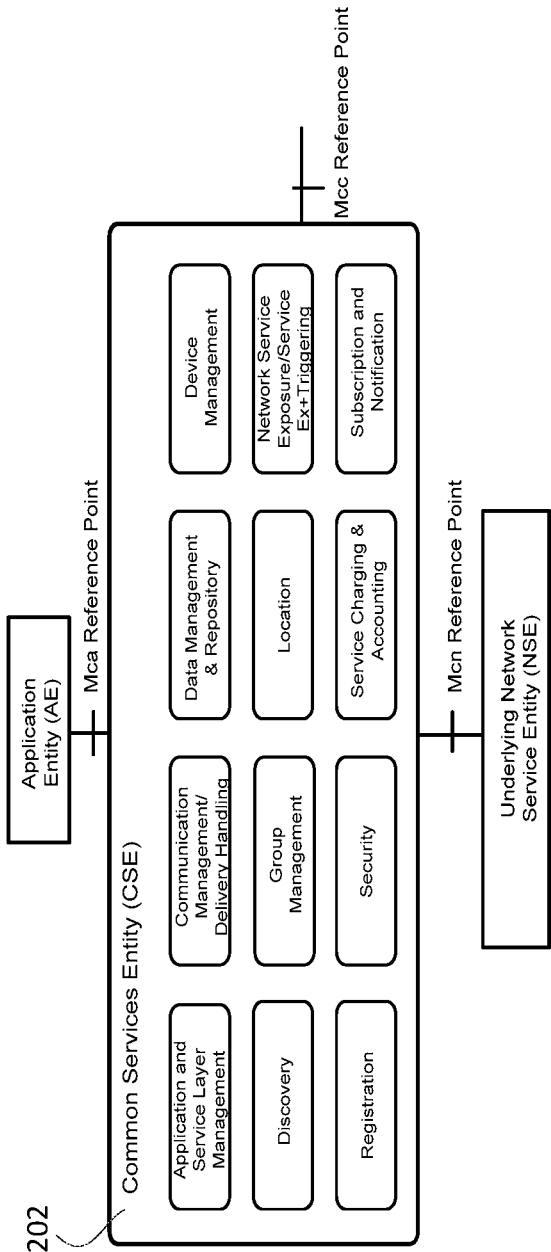
FIG. 2 is a diagram of Common Service Entity (CSE) and Common Service Functions (CSF).
Figure 3:
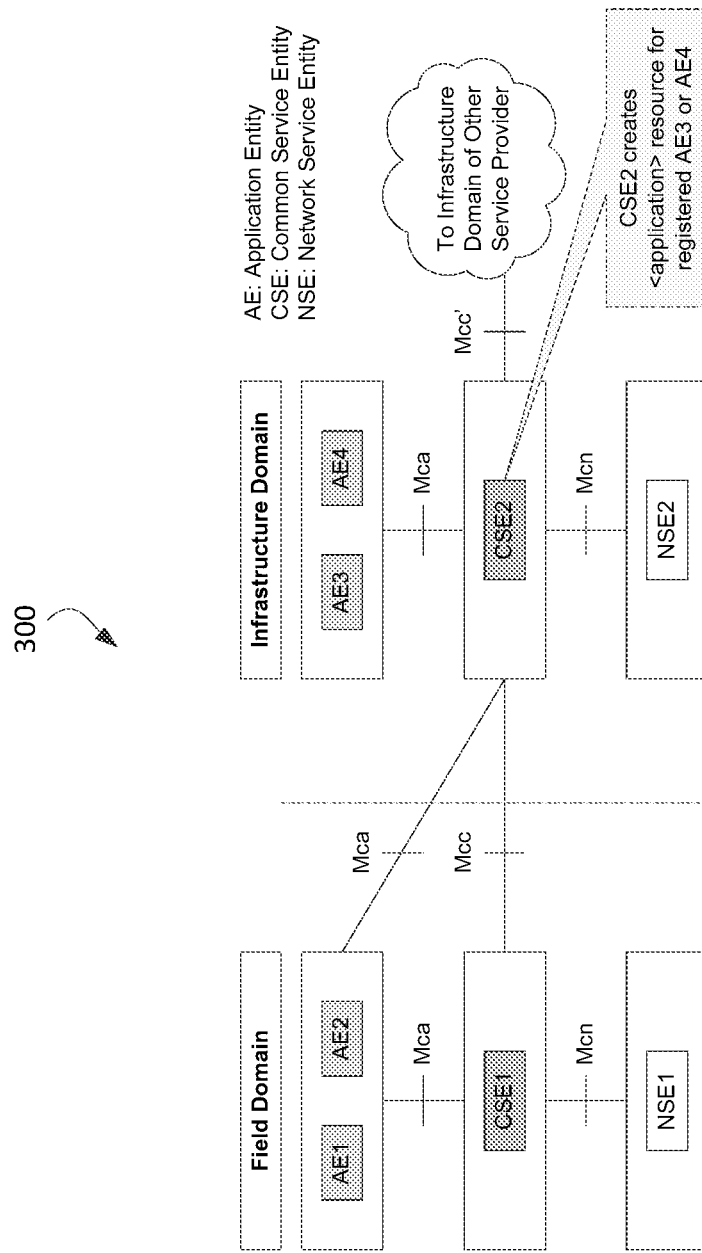
FIG. 3 is a diagram of oneM2M Service Layer Functional Architecture (ROA)
Figure 4:
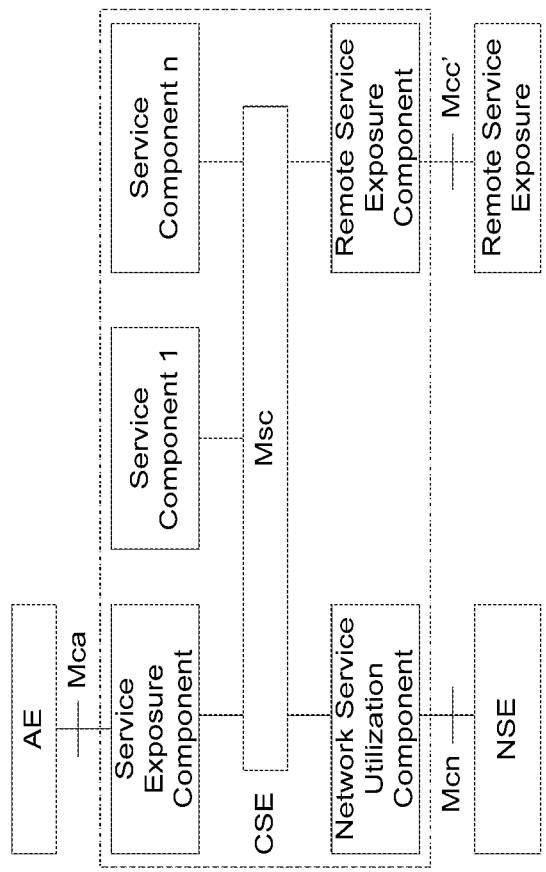
FIG. 4 is a diagram of oneM2M Services Component Architecture (SOA)
Figure 5:
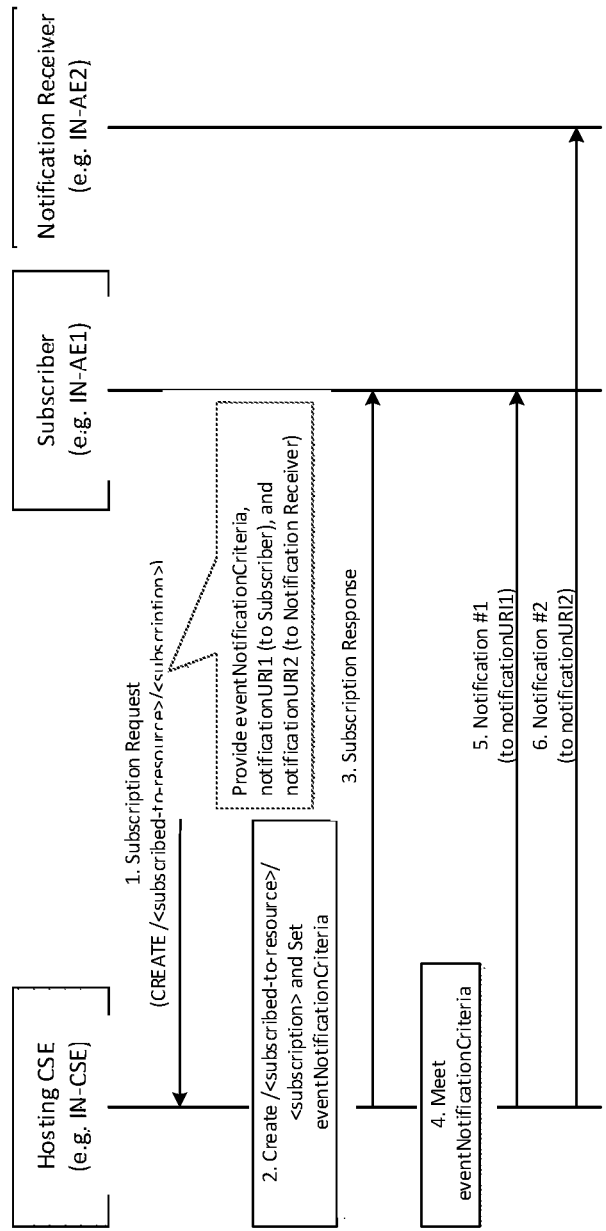
FIG. 5 is a diagram of oneM2M General Subscription and Notification Procedure
Figure 6:
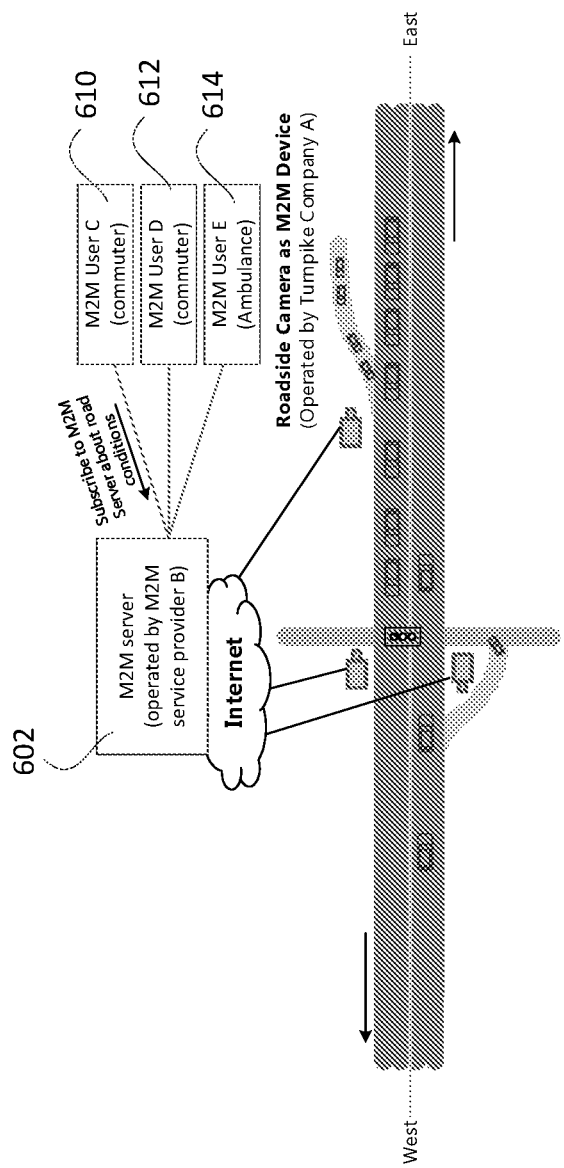
FIG. 6 is a diagram of Intelligent Transportation with Road Condition Subscription

FIG. 6 illustrates an intelligent transportation scenario where users subscribe to road condition data. In this scenario, a Turnpike Company A deploys roadside cameras which can report road conditions to the M2M Server which resides in the cloud and is operated by an M2M Service Provider B. Although traffic condition information can be received from bypassing vehicle, it is not the focus of this use case. The M2M Service Provider B deploys an M2M Server 602 (i.e. IN-CSE) to provide near real-time road conditions to M2M Users C, D, and E (e.g. IN-AE installed on commuter's smart phone). In this use case, it is assumed that Roadside Cameras as M2M Device have M2M service layer capabilities (e.g. data repository and management). Due to the large volume of video files generated by roadside cameras, only interested conditions or events (e.g. light traffic congestion, medium traffic congestion, and heavy traffic congestion) will be reported to the M2M Server 602 and eventually forwarded to M2M Users based on subscription/notification mechanism. Note that such traffic conditions (i.e. light congestion, etc.) can be concluded by Roadside Camera through image processing and analysis. For example, M2M User C 610 makes a subscription to a Roadside Camera on the traffic congestion level via the M2M Server. When the Roadside Camera detects a heavy congestion, it sends a notification to the M2M Server which will relay the notification to M2M User C 610 (although the Roadside Camera can send notification to M2M User C directly as well if it maintains the URI of M2M User C), if M2M Users C, D, and E may only have business relationship with the M2M Service Provider B. In addition, commuter users may have similar interest (e.g. congestion level on an exit) in road condition data. In this scenario, road condition data stored at Roadside Camera is accessed by M2M Users 610, 612 and 614 based on subscription/notification mechanism. But road condition data itself is regarded as public information and accessible for everyone to use without much privacy concern but certain usage-based fee may be charged.

Figure 7:
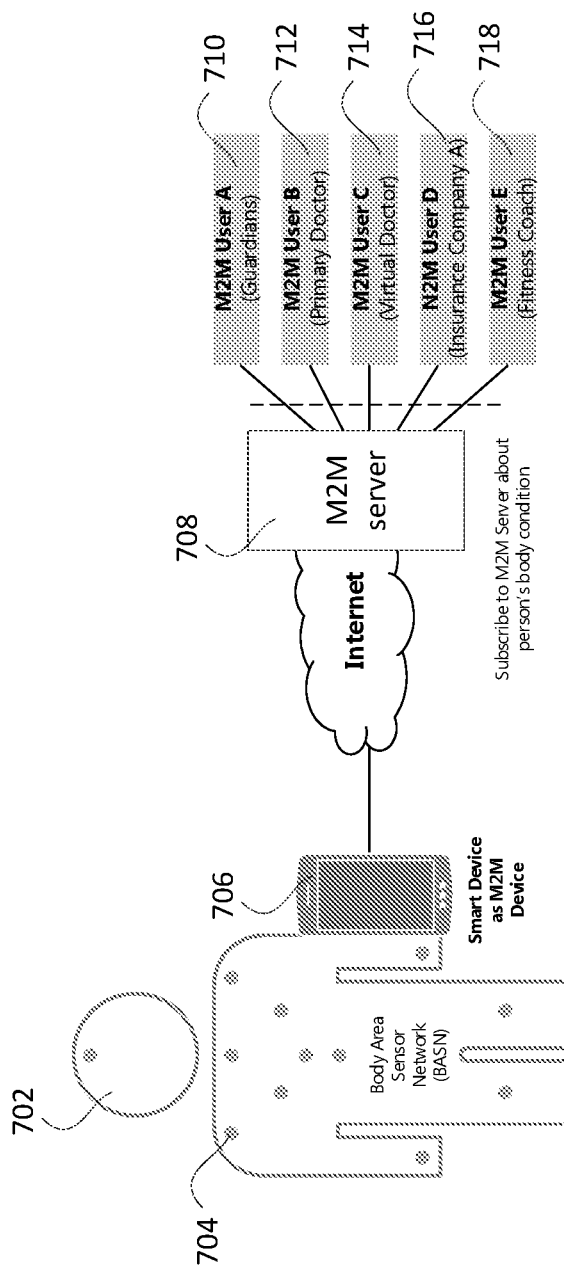
FIG. 7 is a diagram of Smart Health with Body Condition Subscription

FIG. 7 illustrates another scenario where a senior person 702 has a few sensors, such as sensor 704, on her/his body to monitor real-time body conditions. The body conditions especially detected anomalies can be reported to the M2M Server (i.e. IN-CSE) via the person's Smart Device 706 (i.e. MN-CSE). The M2M Server is operated by an M2M Service Provider F 708. The Smart Device 706 as an M2M Device have M2M service layer capabilities as well; in other words, it stores body condition data which can be subscribed by M2M Users 710, 712, 714, 716 and 718. The person has relationship with the M2M Service Provider F 708. There are a few users who are interested in this person's body condition data and make subscriptions to it, for example, the person's guardians, the person's primary doctor, the person's virtual doctor (e.g. Doctor on Demand application), the person's insurance company, and the person's fitness coach. These users have relationship with the person and may be interested in different types of body conditions and their subscriptions to body condition data could be different. In this scenario, body condition data stored at Smart Device 706 is subscribed by different actors/users in a smart health ecosystem. Furthermore, there is privacy concerns about body condition data and the users have different access rights to the person's body condition data. In addition, an M2M User A 710 may issue a subscription request to ask for notifications to multiple notification receivers (e.g. M2M User B 712, M2M User C 714, etc.)

It is understood that the functionality illustrated in FIGS. 6-7 may be implemented in the form of software (i.e., computer-executable instructions) stored in a memory of, and executing on a processor of, an apparatus of an M2M network (e.g., a server, gateway, device, or other computer system), such as one of those illustrated in FIG. 23C or 23D described below.

As described in previous use cases, data which is generated or collected at the end devices (i.e. traffic condition data in intelligent transportation and body condition data in smart health) is subscribed by various applications via an M2M server. Such subscription-based data access is abstracted and depicted in FIG. 8, where three or more M2M applications as M2M users make subscription via M2M Node 1 (e.g. the M2M Server) to the data generated at M2M Node2 (e.g. roadside cameras in intelligent transport or body sensors in smart health). Such subscription is routed through M2M Node1.

Figure 8:
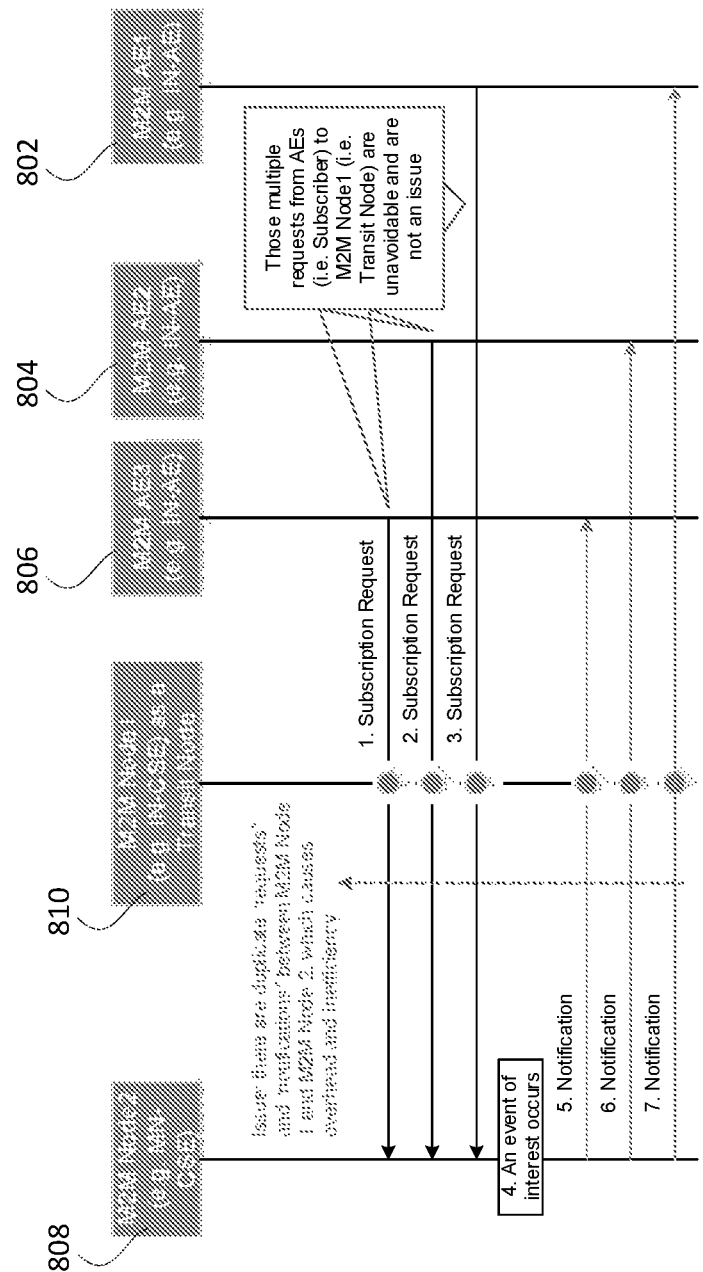
FIG. 8 is a diagram of Multiple Subscribers to the Same Resource

As FIG. 8 shows, each application entity 802, 804 and 806 as a subscriber issues a separate subscription to M2M Node2 808. When an event of interest occurs, M2M Node2 808 sends three notifications, respectively to each M2M application. As mentioned early in intelligent transport, those M2M applications (e.g. an application installed on commuters' smart phone) are all interested in traffic load condition and issue almost the same subscription requests; in other words, subscription requests in Step 1, Step 2 and Step 3 are the same. Then, those three notifications issued by M2M Node2 808 are also the same. In other words, when M2M applications have the similar subscription, multiple subscription requests will be sent to M2M Node2 808 (i.e. hosting node) and M2M Node2 808 also sends multiple notifications to M2M application via M2M Node1 810 (i.e. transit node). Those multiple subscription requests and notifications between transit node 810 and hosting node 808 are inefficient and introduce extra overhead especially when there are a great number of M2M applications as subscribers. Moreover, existing oneM2M service layer lacks of functionalities to analyze and leverage relationships among different subscription requests.

Figure 23A:
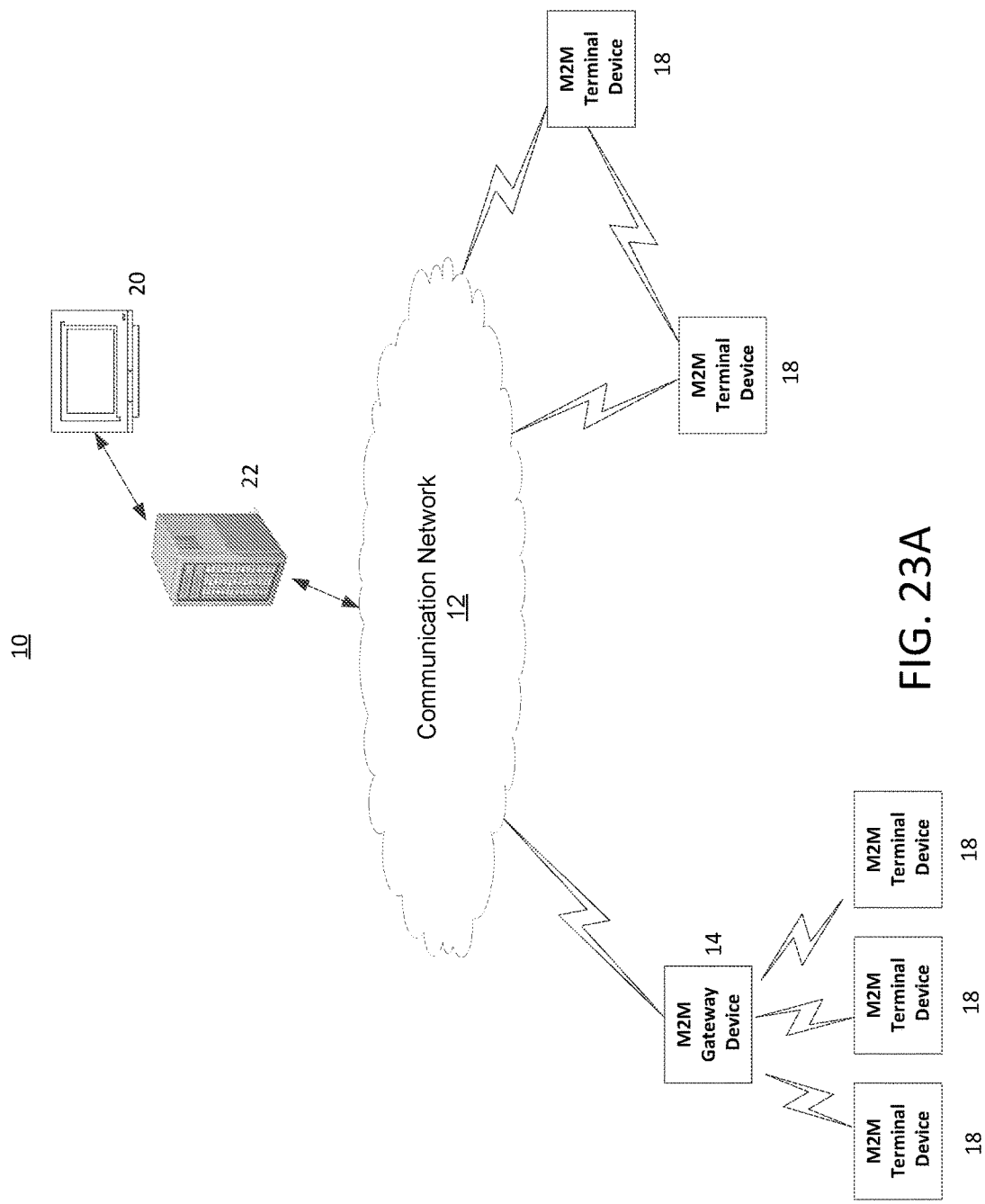
FIG. 23A is a system diagram of an example machine-to-machine (M2M) or Internet of Things (IoT) communication system in which one or more disclosed embodiments may be implemented.
Figure 23B:
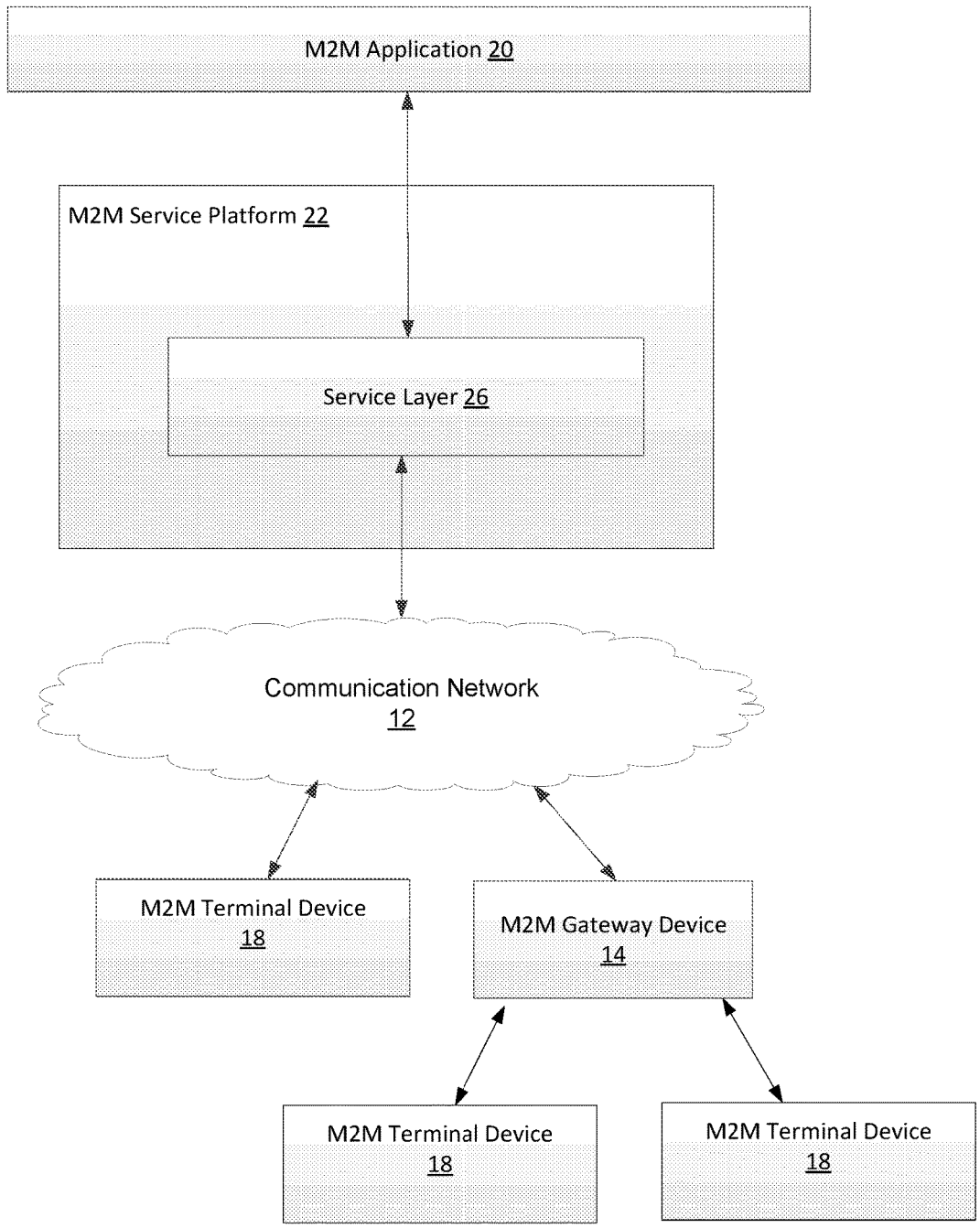
FIG. 23B is a system diagram of an example architecture that may be used within the M2M/IoT communications system illustrated in FIG. 23A.
Figure 23C:
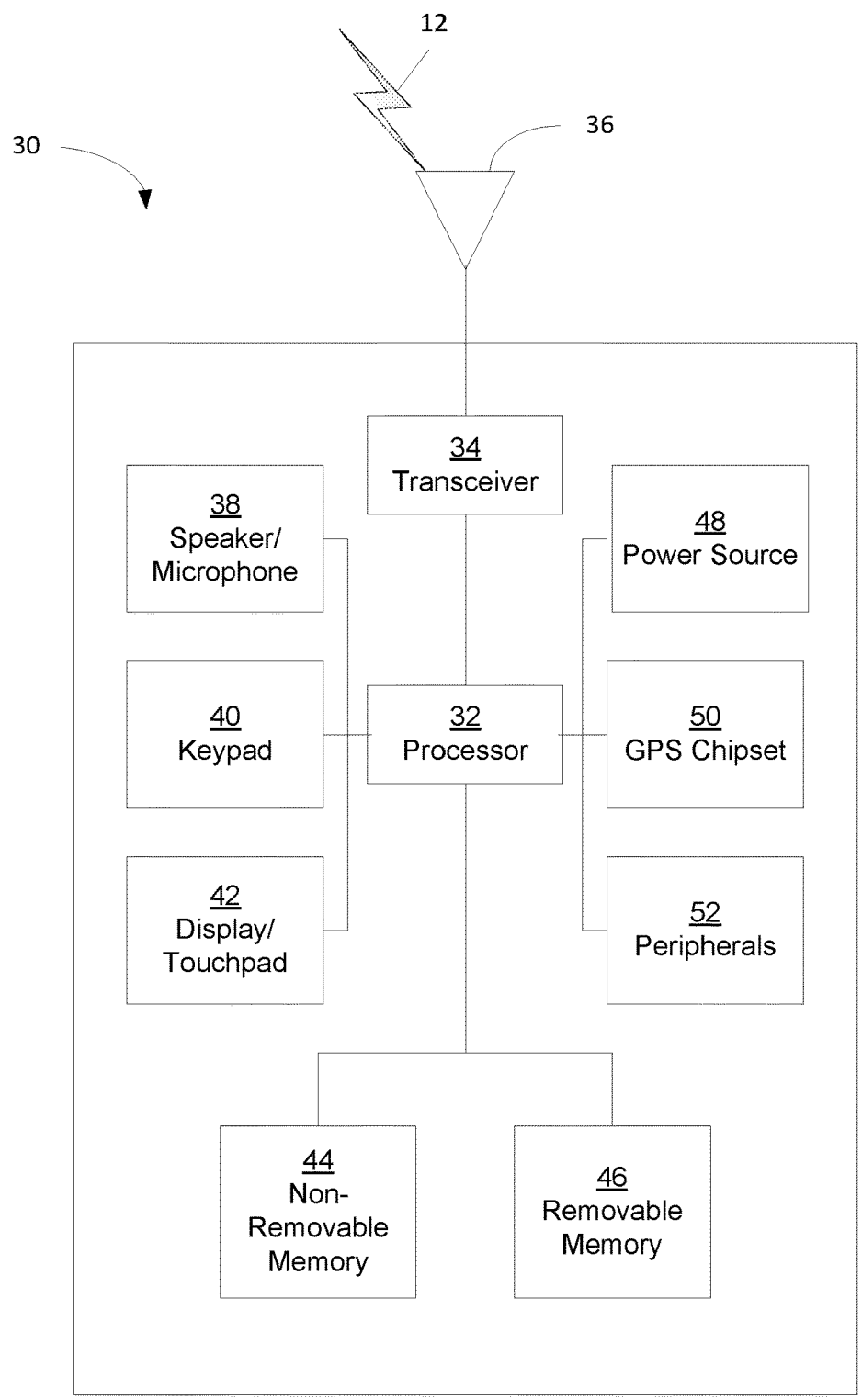
FIG. 23C is a system diagram of an example M2M/IoT terminal or gateway device that may be used within the communications system illustrated in FIG. 23A
Figure 23D:
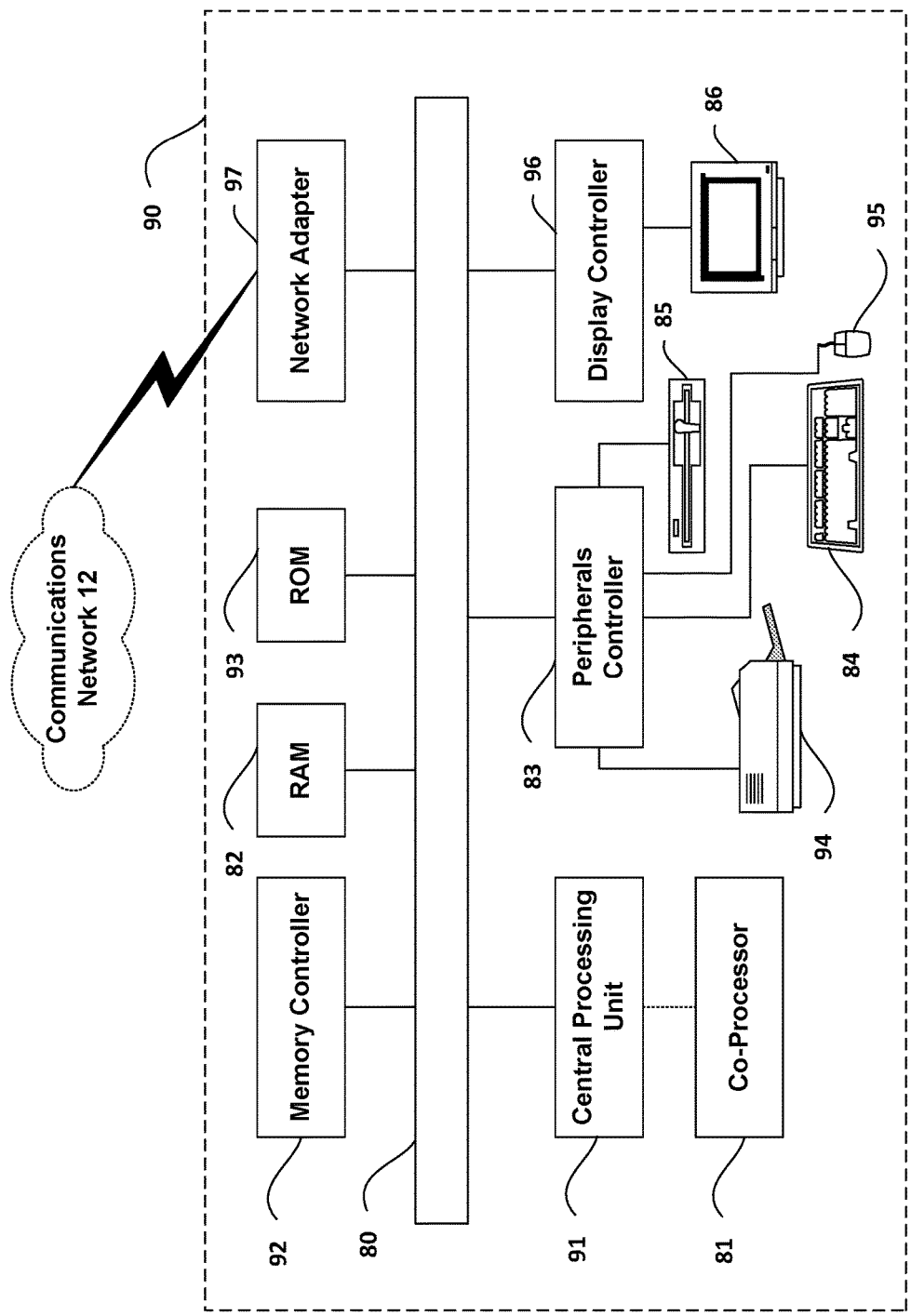
FIG. 23D is a block diagram of an example computing system in which aspects of the communication system of FIG. 23A may be embodied.

It is understood that the entities performing the steps illustrated in FIG. 8 are logical entities that may be implemented in the form of software (i.e., computer-executable instructions) stored in a memory of, and executing on a processor of, a network node or computer system such as those illustrated in FIG. 23C or FIG. 23D. That is, the method(s) illustrated in FIG. 8 may be implemented in the form of software (i.e., computer-executable instructions) stored in a memory of a network apparatus, such as the apparatus or computer system illustrated in FIG. 23C or FIG. 23D, which computer executable instructions, when executed by a processor of the node, perform the steps illustrated in FIG. 8. It is also understood that any transmitting and receiving steps illustrated in FIG. 8 may be performed by communication circuitry of the node under control of the processor of the node and the computer-executable instructions (e.g., software) that it executes.

To solve the problem described above and optimize the existing subscription mechanism in oneM2M, this disclosure proposes new architecture and methods to enable subscription analyzing and grouping. The essential idea is to analyze and group subscribers' subscription requests at hosting node (or transit node); the hosting node will then generate aggregated notification to the transit node, the transit node will then distribute individual notifications to the original subscribers. Compared to the existing subscription mechanism in oneM2M, the proposed approaches reduce the number of subscription request and notification messages and make the subscription between subscribers and hosting nodes more efficient.

Figure 9:
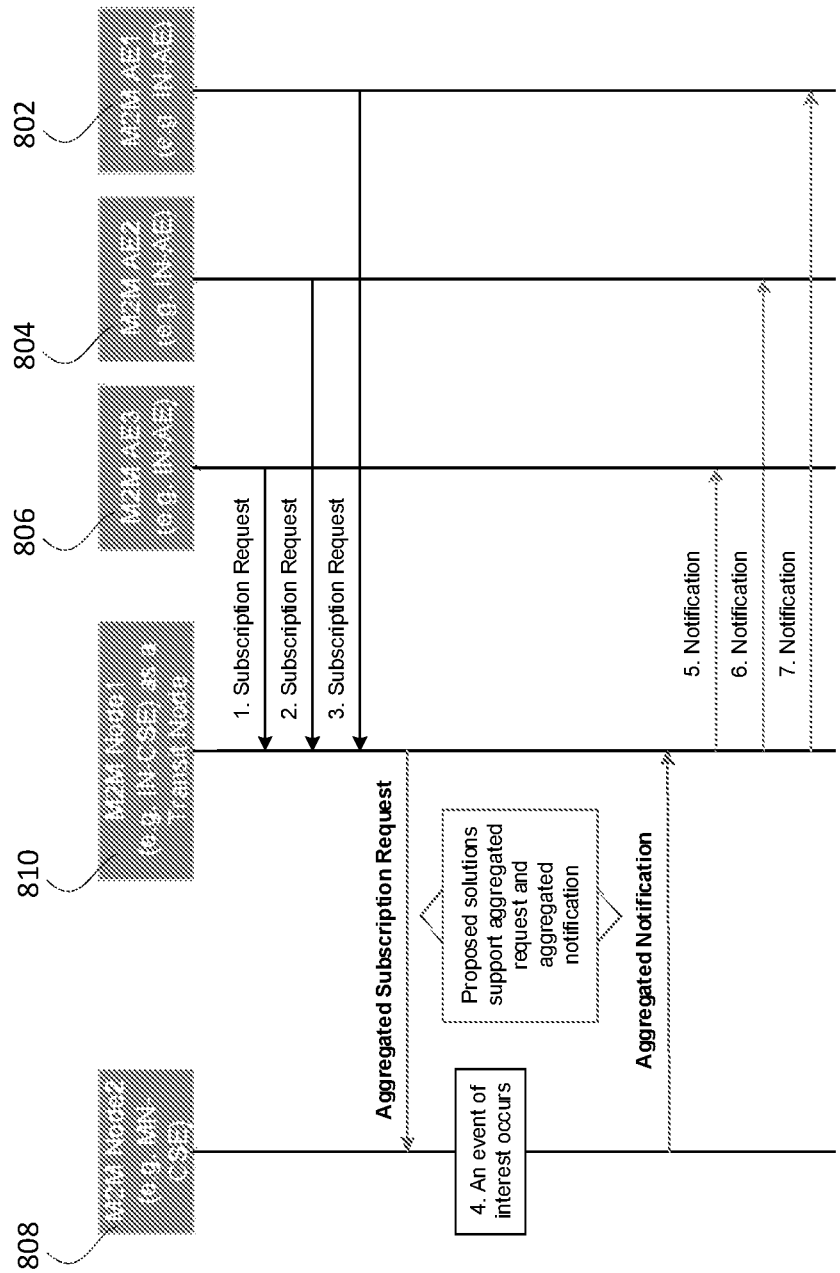
FIG. 9 is a flow chart of an aggregated subscription and notification system.

FIG. 9 shows a call flow of an exemplary embodiment where M2M Node 2 808 receives aggregated subscription requests and sends aggregated notifications to M2M Node 1 810. M2M Node 1 810 aggregates the subscription requests from M2M AEs 802, 804 and 806. M2M Node 1 810 also sends individual notifications to M2M AEs 802, 804 and 806 after receiving an aggregated notification from M2M Node 2 808.

It is understood that the entities performing the steps illustrated in FIG. 9 are logical entities that may be implemented in the form of software (i.e., computer-executable instructions) stored in a memory of, and executing on a processor of, a network node or computer system such as those illustrated in FIG. 23C or FIG. 23D. That is, the method(s) illustrated in FIG. 9 may be implemented in the form of software (i.e., computer-executable instructions) stored in a memory of a network apparatus, such as the apparatus or computer system illustrated in FIG. 23C or FIG. 23D, which computer executable instructions, when executed by a processor of the node, perform the steps illustrated in FIG. 9. It is also understood that any transmitting and receiving steps illustrated in FIG. 9 may be performed by communication circuitry of the node under control of the processor of the node and the computer-executable instructions (e.g., software) that it executes.

First, two subscription analyzing and grouping architecture options are presented, namely, subscription analyzing and grouping at hosting node and transit node, respectively. The proposed architecture includes two new services: SAGS 1002 and NODS 1004. Functionalities of SAGS 1002 and NODS 1004 are described. Subscription analyzing and grouping at hosting and transit node are discussed. New procedures are described for subscription via announced resources.

Overall, the proposed ideas in this disclosure can perform subscription aggregation for the following scenarios:

Multiple subscribers make subscriptions to the same resource with the same event notification criteria. The subscription requests from those subscribers can be aggregated and the notifications to them can also be aggregated.

Multiple subscribers make subscriptions to the same resource but with different event notification criteria. The subscription requests from those subscribers can be aggregated and the notifications to them can also be aggregated.

A subscriber makes subscription to a resource and gives multiple notification receivers. The notifications to those multiple receivers can be aggregated.

Figure 10:
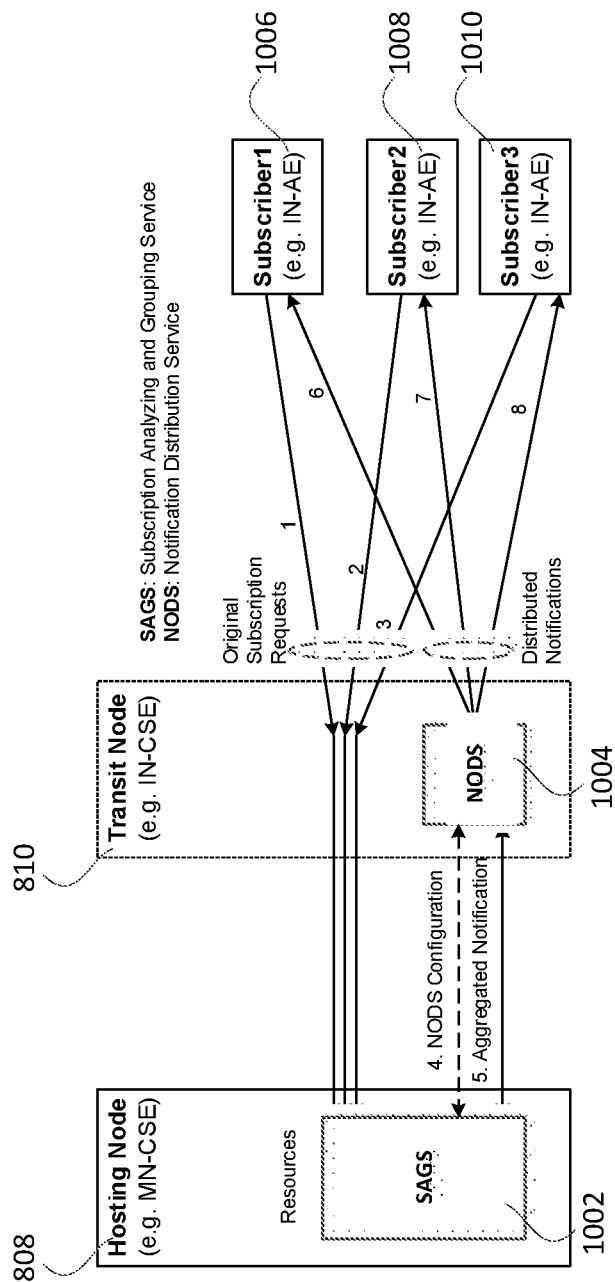
FIG. 10 is a diagram of Subscription Analyzing and Grouping Architecture A

FIG. 10 illustrates the proposed subscription analyzing and grouping architecture with two new services are proposed, namely, SAGS 1002 and NODS 1004. SAGS 1002 resides in the hosting node while NODS 1004 is placed in a transit node. Original subscription requests (e.g. Steps 1-3) respectively from three or more subscribers arrive at the hosting node (either directly or indirectly via the transit node). Note that each subscription request has a notification URI where the notification is supposed to send. SAGS 1002 analyzes received subscriptions requests and assigns them to different groups, referred to as subscription group. For example, subscription requests in Step 1-3 will be placed in the same group if they are interested in the same subscribed-to-resource with the similar event notification criteria. Then SAGS 1002 may need to configure NODS 1004 (i.e. Step 4) with the information about the grouped subscription requests and the notification URI of each original subscription request. NODS 1004 relies on such configuration information to be able to distribute notifications to subscribers later (i.e. Step 6-8); otherwise, SAGS 1002 needs to include such information (esp. notification URI) in each aggregated notification (i.e. Step 5) so that NODS 1004 is able to interpret the aggregated notification and distribute it to appropriate subscribers (i.e. Step 6-8 of FIG. 10). Note that original subscription requests may pass through a transit node different from the one where NODS 1004 resides. The details of each step in this architecture will be discussed in later sections.

To facilitate more subscription analyzing and grouping opportunities, it is proposed that each resource has a set of mutually exclusive event notification criteria which can be pre-configured by the Hosting Node. Then subscribers will make subscription based on those event notification criteria. For example, the following criteria can be configured to the traffic condition resource in intelligent transportation use case of FIG. 6. By following those configured event notification criteria, there may be higher possibility and more opportunities of similar subscription requests from subscribers and being grouped, in contrast to random event notification criteria issued by each subscriber.

Event Notification Criterion #1: "Traffic Condition"="No Congestion"
Event Notification Criterion #2: "Traffic Condition"="Sporadic Congestion"
Event Notification Criterion #3: "Traffic Condition"="Light Congestion"
Event Notification Criterion #4: "Traffic Condition"="Medium Congestion"
Event Notification Criterion #5: "Traffic Condition"="Heavy Congestion"

Note that even for a single subscriber, corresponding notifications can still be aggregated if the subscriber indicates multiple notification receivers. In this case, SAGS 1002 configures NODS 1004 with the addresses of all notification receivers; then it sends an aggregated notification to NODS 1004; finally, NODS 1004 will distribute the notification to all notification receivers.

Figure 11:
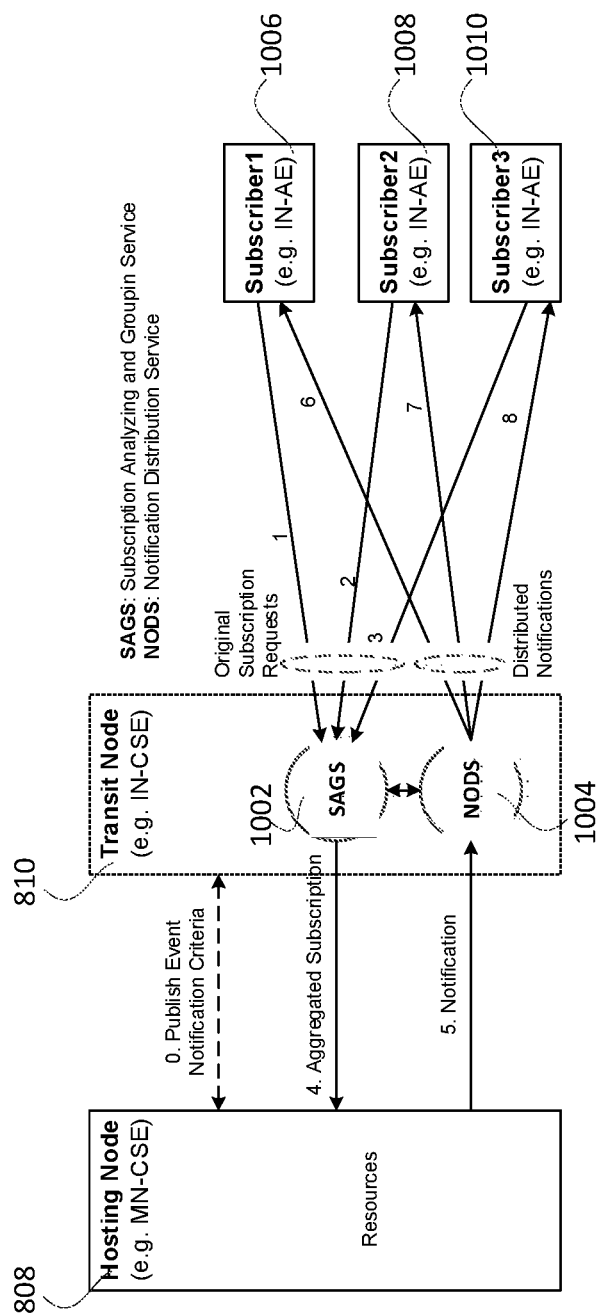
FIG. 11 is a diagram of Subscription Analyzing and Grouping Architecture B

Alternatively subscription requests can also be grouped at a Transit Node 810 where subscription requests will be relayed or routed through, which is illustrated in FIG. 11. First, the Hosting Node 808 may optionally publish event notification criteria of its resources to the Transit Node 810 (Step 0 of FIG. 11). Then Subscribers 1006, 1008, and 1010 can discover those event notification criteria and subscribe to them. If multiple Subscribers make subscription to the same resource on the same event notification criteria (i.e. Step 1, Step 2, and Step 3 of FIG. 11), SAGS 1002 in the Transit Node 810 can group those subscription requests and in turn sends one single but aggregated subscription request to the Hosting Node 808 (i.e. Step 4). SAGS 1002 will inform NODS 1004 of such subscription grouping. When the event of interest happens, the Hosting Node 808 sends a regular notification to NODS 1004 (i.e. Step 5). NODS 1004 will distribute the notification to original Subscribers (i.e. Step 6, Step 7, and Step 8). Although SAGS 1002 and NODS 1004 are shown in the same Transit Node 810 in FIG. 11, but the SAGS 1002 and NODS 1004 can be located in different Transit Nodes. The details of each step will be described below.

Note that SAGS 1002 in Architecture B has similar functionalities as that in Architecture A (i.e. FIG. 10) with a new function for sending the aggregated subscription request to the Hosting Node (i.e. Step 4 in FIG. 11). NODS 1004 in Architecture B has the same functionalities as that in Architecture A.

Note that even subscribers indicate different event notification criteria in their subscription requests, their subscription requests still can be grouped once they target the same subscriber-to-resource. For example, Assume three subscribers 10006, 1008, and 1010 are interested in the same <subscriber-to-resource>. They issue three subscription requests to the Transit Node 810. In their requests, subscriber1 indicates eventNotificationCriteria1, subscriber2 indicates eventNotificationCritera2, and subscriber3 indicates eventNotificationCriteria3. It is also assumed that eventNotificationCriteria1, eventNotificationCritera2, and eventNotificationCriteria3 are mutually exclusive of each other.

The transit node 810 analyzes and groups those three request and generate the aggregated subscription request, which contains eventNotificationCriteria1, eventNotificationCritera2, and eventNotificationCriteria3.

When an event happens and it meets either eventNotificationCriteria1, eventNotificationCritera2, or eventNotificationCriteria3. It sends a notification to transit node 810. This notification will contain the corresponding event notification criteria, based on which the transit node 810 knows the subscriber for receiving this notification. When eventNotificationCriteria1, eventNotificationCritera2, and eventNotificationCriteria3 are not mutually exclusive of each other, the transit node 810 can determine a few mutually exclusive eventNotificationCriteria and include them in the aggregated subscription to the hosting node. Then, when receiving the notification from the hosting node, it is still able to figure out the right subscribers to receiving this notification.

It is understood that the entities performing the steps illustrated in FIGS. 10 and 11 are logical entities that may be implemented in the form of software (i.e., computer-executable instructions) stored in a memory of, and executing on a processor of, a network node or computer system such as those illustrated in FIG. 23C or FIG. 23D. That is, the method(s) illustrated in FIGS. 10 and 11 may be implemented in the form of software (i.e., computer-executable instructions) stored in a memory of a network apparatus, such as the apparatus or computer system illustrated in FIG. 23C or FIG. 23D, which computer executable instructions, when executed by a processor of the node, perform the steps illustrated in FIGS. 10 and 11. It is also understood that any transmitting and receiving steps illustrated in FIGS. 10 and 11 may be performed by communication circuitry of the node under control of the processor of the node and the computer-executable instructions (e.g., software) that it executes.

The functionalities and operations of SAGS 1002 and NODS 1004 are described below with respect to the FIGS. 12-16.

SAGS 1002 has a few functionalities including

Figure 12:
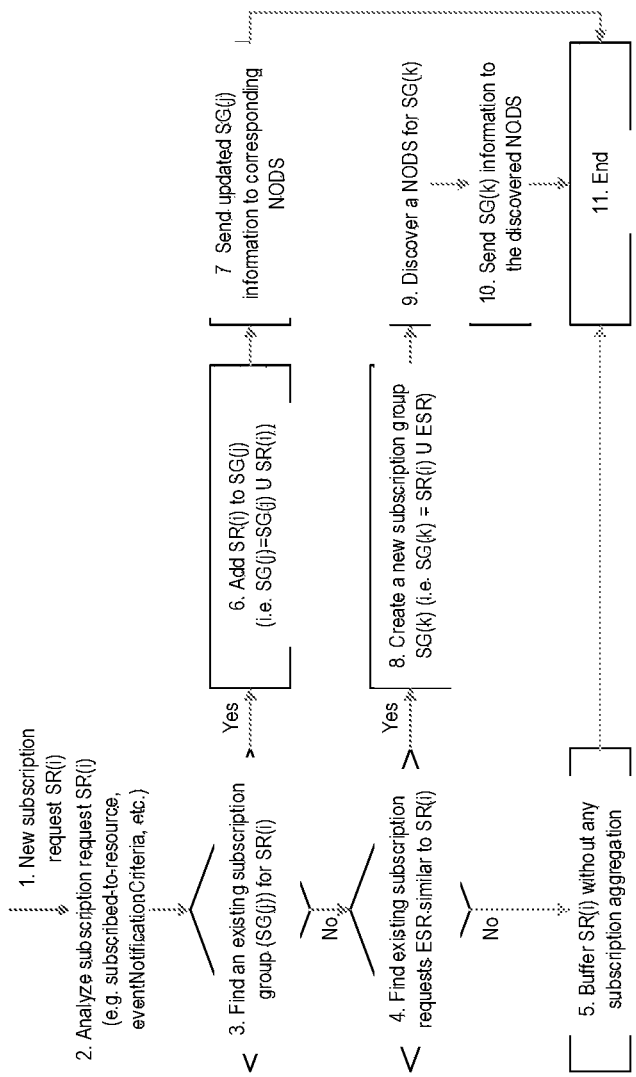
FIG. 12 is a Flow Chart of a new subscription request at a SAGS 1002.

FIG. 12 shows operations when SAGS 1002 receives a new subscription request SR(i)

Figure 13:
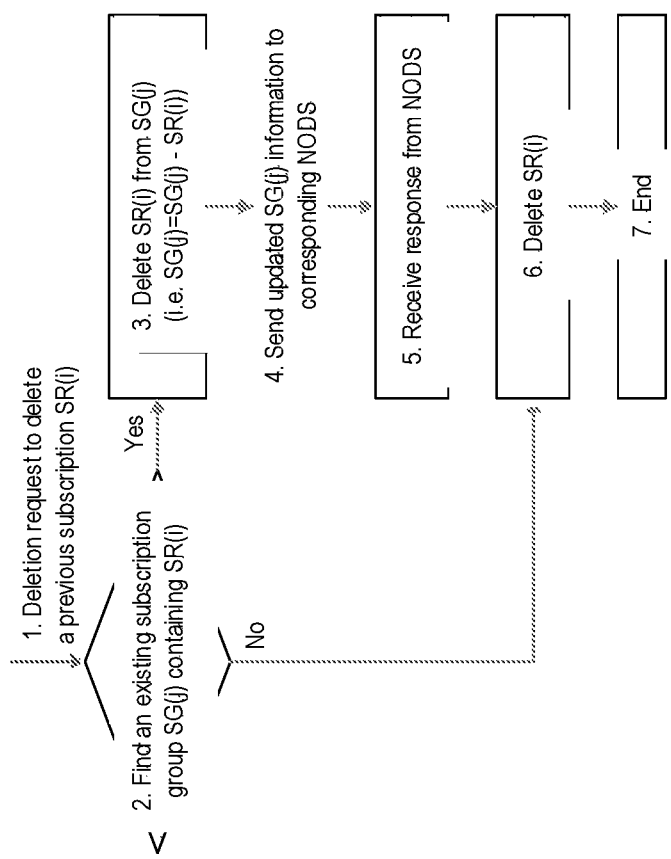
FIG. 13 is a Flow Chart of a subscription deletion request at a SAGS 1002.

FIG. 13 shows operations when SAGS 1002 receives a request to delete an existing subscription request SR(i)

Figure 14:
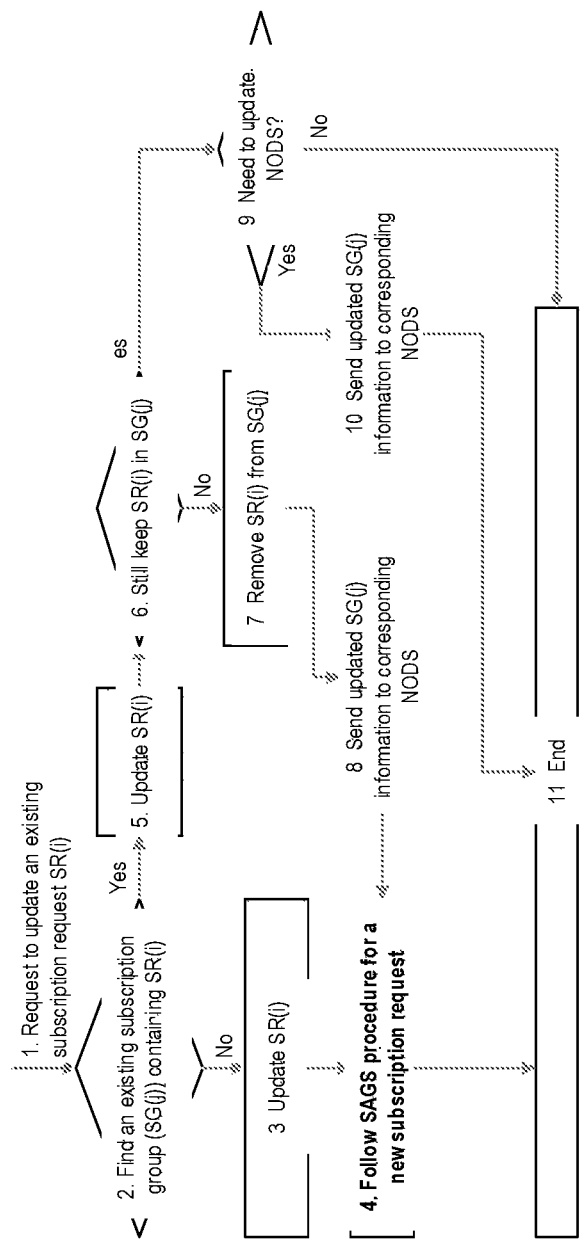
FIG. 14 is a Flow Chart of a subscription update request at a SAGS 1002.

FIG. 14 shows operations when SAGS 1002 receives a request to update an existing subscription request SR(i)

Figure 16:
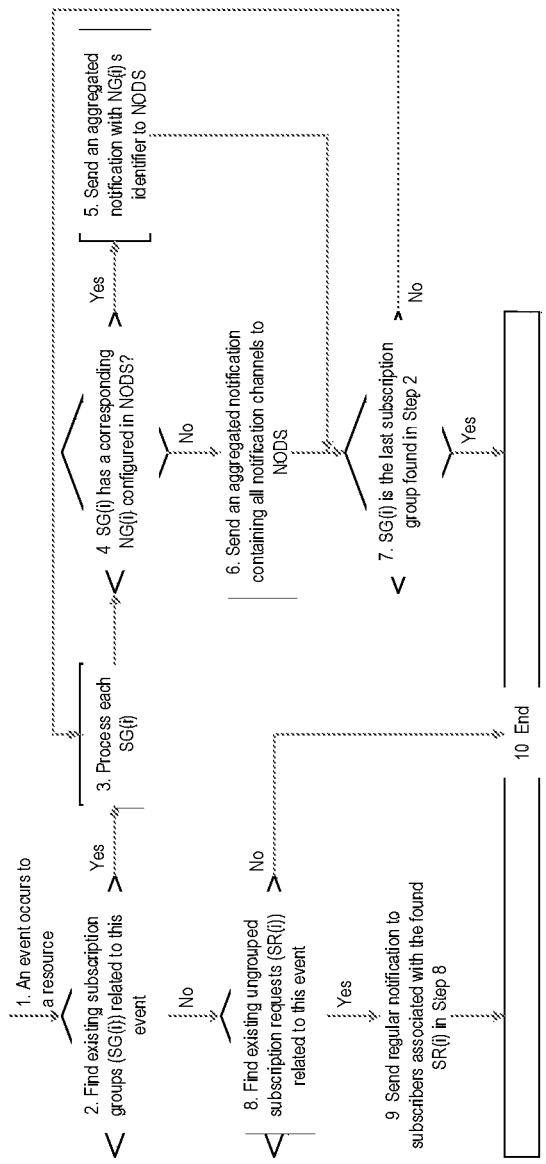
FIG. 16 is a Flow Chart of an event occurring and the SAGS 1002 sending an aggregated notification to NODS 1004 or regular notifications.

FIG. 16 shows operations when an event occurs and SAGS 1002 needs to send an aggregated notification to NODS 1004.

Figure 15:
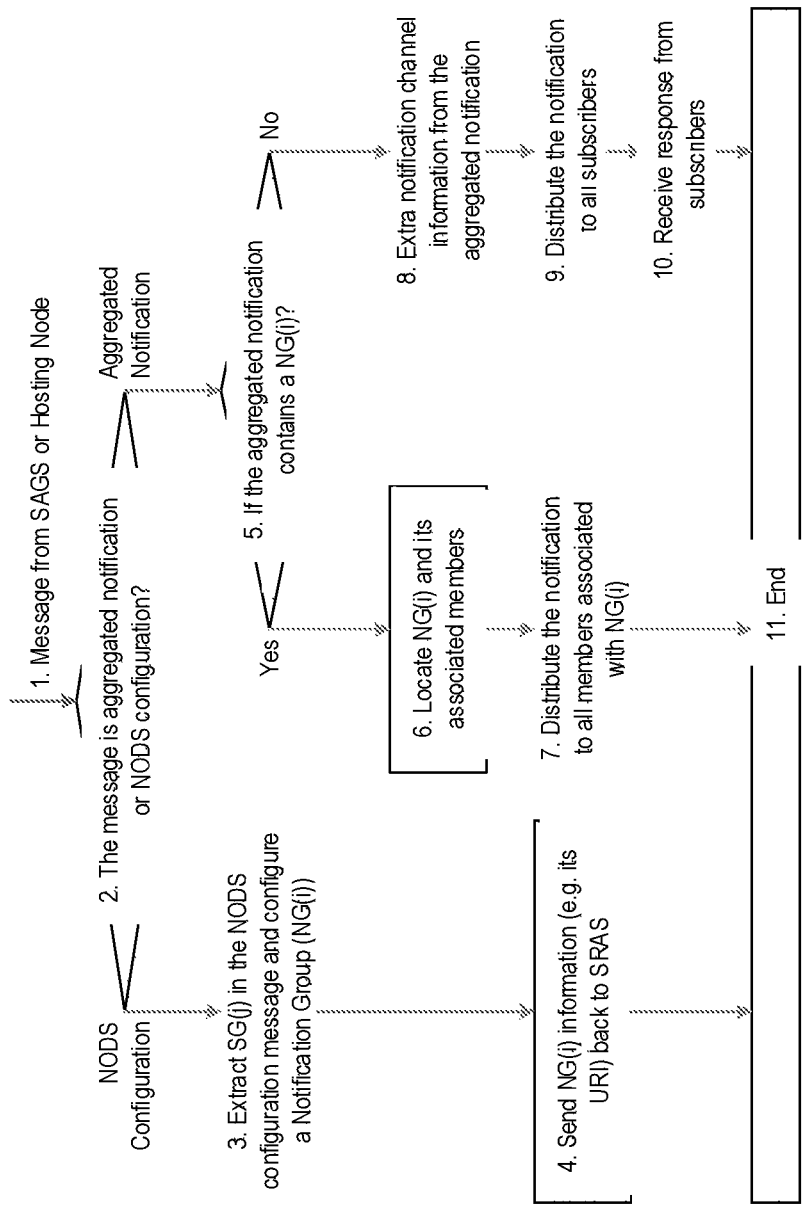
FIG. 15 is a Flow Chart of the operation at an NODS 1004.

NODS 1004 functionalities are given in FIG. 15.

FIG. 12 illustrates the operations of SAGS 1002 when it receives a new subscription request SR(i).

In step 1 of FIG. 12, A new subscription request SR(i) arrives.

In step 2 of FIG. 12, SAGS 1002 analyzes SR(i) and obtains information such as subscribed-to-resource r(i), event notification criteria enc(i), and notification URI nu(i). From the received SR(i), SAGS 1002 may also know and record the address of the Transit Node 810 (i.e. tn(i))

For architecture A where SAGS 1002 resides in the hosting node, the Transit Node 810 can insert its address to the SR(i) before forwarding it to SAGS 1002 or subscribers can include the Transit Node 810 address in their subscription request.

For architecture B where SAGS 1002 resides in the transit node 810, tn(i) could be the same transit node 810 or a different transit node which can be indicated in the subscription request by subscribers.

In step 3 of FIG. 12, SAGS 1002 searches its local database (i.e. all subscription groups created previously) to find an existing subscription group SG(j) which can accommodate SR(i). Note that a subscription group in this disclosure is defined as a set of subscription requests which have similar subscription requirements (e.g. the same subscribed-to-resource and the same transit node 810 as well as the similar event notification criteria, etc.). Each member of a subscription group is a received subscription request. In other words, each subscription group has three common attributes: subscribed-to-resource, transit node 810, and event notification criteria, which are shared by all its member subscription requests. SAGS 1002 may set a limit for the number of subscription requests which a subscription group can has.

If a SG(j) is found, it means SR(i) has the same subscribed-to-resource and similar event notification criteria as other requests in SG(j). Then move to Step 6 to group SR(i) to SG(j) if SG(j) can still accommodate new requests. If SG(j) cannot accommodate new requests any more, move to Step 4.

If there is no such a SG(j), go to Step 4.

In step 4 of FIG. 12, SAGS 1002 searches its local database (i.e. all subscription requests received before but not grouped yet) to find an ungrouped subscription request (USR) which has the same subscribed-to-resource as SR(i), the same transit node 810 as SR(i), and similar event notification criteria as SR(i).

If a USR is found, it means SR(i) and ESR can be grouped together to formulate a new subscription group. Then move to Step 8.

If such an USR is not found, go to Step 5.

In step 5 of FIG. 12, SAGS 1002 buffers SR(i) without any subscription aggregation. Then the procedure for processing this SR(i) is complete.

In step 6 of FIG. 12, From step 4, SAGS 1002 adds SR(i) to the list of subscription requests contained by SG(j). Since SG(j) is changed now, SAGS 1002 may need to send an update to the corresponding NODS 1004 to inform it of this change (i.e. the added SR(i) especially its notification URI nu(i)). Note that Step 9 discusses how to determine an appropriate NODS 1004 for a newly created subscription group.

In step 7 of FIG. 12, SAGS 1002 sends a message to NODS 1004 to notify it of the new SR(i) being added to SG(j). Basically, NODS 1004 maintains notification URIs of all subscription requests of SG(j). Now, SAGS 1002 tells NODS 1004 of the notification URI of SR(i). Then the procedure for processing this SR(i) is completed.

In step 8 of FIG. 12, SAGS 1002 creates a new subscription group SG(k) which includes two subscription requests SR(i) and USR. Note that both SR(i) and USR has the same subscribed-to-resource, the same transit node 810, and similar event notification criteria. This common transit node 810 will be selected as the node where NODS 1004 should resides.

In step 9 of FIG. 12, SAGS 1002 selects the common transit node 810 of SR(i) and USR as the node to host NODS 1004 to serve SG(k).

Note that SR(i) may indicate the address of a NODS 1004. Likewise, USR may also contain a NODS 1004 address. It is assumed that both SR(i) and USR have the same NODS 1004 address; otherwise they will not be aggregated. In other words, if subscription requests indicate NODS 1004 address, the common NODS 1004 address of subscription requests within a subscription group will be selected as the NODS 1004 for this subscription group.

In step 10 of FIG. 12, SAGS 1002 sends a message to NODS 1004 to inform it of the newly created SG(k). Basically, SAGS 1002 tells NODS 1004 notification URIs of SR(i) and USR. Such information will be maintained by NODS 1004 and leveraged later by NODS 1004 to distribute notifications to the subscriber of SR(i) and USR.

In step 11 of FIG. 12, SAGS 1002 finishes processing the new subscription request SR(i).

It is understood that the entities performing the steps illustrated in FIG. 12 are logical entities that may be implemented in the form of software (i.e., computer-executable instructions) stored in a memory of, and executing on a processor of, a network node or computer system such as those illustrated in FIG. 23C or FIG. 23D. That is, the method(s) illustrated in FIG. 12 may be implemented in the form of software (i.e., computer-executable instructions) stored in a memory of a network apparatus, such as the apparatus or computer system illustrated in FIG. 23C or FIG. 23D, which computer executable instructions, when executed by a processor of the node, perform the steps illustrated in FIG. 12. It is also understood that any transmitting and receiving steps illustrated in FIG. 12 may be performed by communication circuitry of the node under control of the processor of the node and the computer-executable instructions (e.g., software) that it executes.

FIG. 13 illustrates the operations of SAGS 1002 when it receives a request to delete an existing subscription request SR(i).

In step 1 of FIG. 13, SAGS 1002 receives a request (e.g. from the subscriber) to delete an existing subscription request SR(i).

In step 2 of FIG. 13, SAGS 1002 tries to find an existing subscription group SG(j) which is formulated previously and includes SR(i)

If such a SG(j) is found, move to Step 3; otherwise, go to Step 5.

In step 3 of FIG. 13, SAGS 1002 removes SR(i) from SG(j).

In step 4 of FIG. 13, SAGS 1002 sends an update to NODS 1004 to inform it the removal of SR(i). Basically, the notification URI of SR(i) which NODS 1004 has maintained will be deleted.

If SG(j) only contain one subscription request after removing SR(i), SAGS 1002 may just delete SG(j) from its local database and also in Step 4 tells NODS 1004 to remove all SG(j) information.

In step 5 of FIG. 13, SAGS 1002 waits for receiving response from NODS 1004. But SAGS 1002 will need to delete SR(i) no matter whether the response from NODS 1004 is a success or failure.

In step 6 of FIG. 13, SAGS 1002 deletes SR(i) from its local database.

In step 7 of FIG. 13, SAGS 1002 finishes processing the request received in Step 1.

It is understood that the entities performing the steps illustrated in FIG. 13 are logical entities that may be implemented in the form of software (i.e., computer-executable instructions) stored in a memory of, and executing on a processor of, a network node or computer system such as those illustrated in FIG. 23C or FIG. 23D. That is, the method(s) illustrated in FIG. 13 may be implemented in the form of software (i.e., computer-executable instructions) stored in a memory of a network apparatus, such as the apparatus or computer system illustrated in FIG. 23C or FIG. 23D, which computer executable instructions, when executed by a processor of the node, perform the steps illustrated in FIG. 13. It is also understood that any transmitting and receiving steps illustrated in FIG. 13 may be performed by communication circuitry of the node under control of the processor of the node and the computer-executable instructions (e.g., software) that it executes.

FIG. 14 illustrates the operations of SAGS 1002 when it receives a request to update an existing subscription request SR(i).

In step 1 of FIG. 14, SAGS 1002 receives a request to update an existing subscription request SR(i) (e.g. change its notification URI)

In step 2 of FIG. 14, SAGS 1002 tries to find an existing subscription group SG(j) which is formulated previously and includes SR(i)

If such a SG(j) is found, move to Step 3; otherwise, go to Step 5.

In step 3 of FIG. 14, SAGS 1002 updates SR(i) according to the request received in Step 1.

In step 4 of FIG. 14, SAGS 1002 takes updated SR(i) as a new subscription request and follows all steps in FIG. 12. Then go to Step 10.

In step 5 of FIG. 14, SAGS 1002 updates SR(i) according to the request received in Step 1.

In step 6 of FIG. 14, SAGS 1002 decides if SR(i) can be still included in its current group SG(j). If the answer is YES, go to Step 9. If the answer is NO, go to Step 7.

In step 7 of FIG. 14, SAGS 1002 removes SR(i) from SG(j).

In step 8 of FIG. 14, SAGS 1002 sends an update to NODS 1004. Basically, the information about SR(i) which NODS 1004 maintained will be removed, for example, the notification URI of SR(i). Then go to Step 4.

In step 9 of FIG. 14, SAGS 1002 decides if it needs to send an update to NODS 1004. For example, if the request in Step 1 asks for updating SR(i)'s notification URI, SAGS 1002 needs to update NODS 1004 with the new notification URI.

If an update is needed, go to Step 10; otherwise, go to Step 11.

In step 10 of FIG. 14, Similar to Step 8. SAGS 1002 sends an update to NODS 1004.

In step 11 of FIG. 14, SAGS 1002 finishes processing the request received in Step 1.

It is understood that the entities performing the steps illustrated in FIG. 14 are logical entities that may be implemented in the form of software (i.e., computer-executable instructions) stored in a memory of, and executing on a processor of, a network node or computer system such as those illustrated in FIG. 23C or FIG. 23D. That is, the method(s) illustrated in FIG. 14 may be implemented in the form of software (i.e., computer-executable instructions) stored in a memory of a network apparatus, such as the apparatus or computer system illustrated in FIG. 23C or FIG. 23D, which computer executable instructions, when executed by a processor of the node, perform the steps illustrated in FIG. 14. It is also understood that any transmitting and receiving steps illustrated in FIG. 14 may be performed by communication circuitry of the node under control of the processor of the node and the computer-executable instructions (e.g., software) that it executes.

FIG. 15 illustrates the operations of NODS 1004.

In step 1 of FIG. 15, NODS 1004 receives a message from SAGS 1002.

In step 2 of FIG. 15, this message could be an aggregated notification or a NODS 1004 configuration. If it is former, move to Step 5; otherwise, go to Step 3.

In step 3 of FIG. 15, NODS 1004 extracts subscription group information (i.e. SG(i)) from the received message in Step 1 and configures a corresponding notification group NG(i). NG(i) contains the following information or attributes:

The identifier of NG(i).

A list of notification URIs of all subscription requests which SG(i) includes. Each notification URI can be regarded as a member of NG(i).

In step 4 of FIG. 15, NODS 1004 sends the identifier or URI of NG(i) to SAGS 1002. SAGS 1002 will add NG(i)'s identifier or URI as a new attribute of SG(i). Then go to Step 11.

In step 5 of FIG. 15, NODS 1004 analyzes the aggregated notification received in Step 1 and determines if it contains an identifier or URI of an existing NG(i). If the answer is YES, move to Step 6; otherwise, go to Step 8.

In step 6 of FIG. 15, NODS 1004 locates the NG(i) from its local database and finds its members (i.e. notification URIs for original subscribers)

In step 7 of FIG. 15, NODS 1004 distributes notification content (as contained the message received in Step 1) to each notification URI. Then go to Step 11.

In step 8 of FIG. 15, NODS 1004 extracts notification URI information from the received aggregated notification message.

In step 9 of FIG. 15, NODS 1004 distributes notification content to each notification URI or subscriber.

In step 10 of FIG. 15, NODS 1004 waits for the response from subscribers. It there is no response back, NODS 1004 may go to Step 9 to retransmit the notification.

In step 11 of FIG. 15, NODS 1004 finishes processing the message received in Step 1.

It is understood that the entities performing the steps illustrated in FIG. 15 are logical entities that may be implemented in the form of software (i.e., computer-executable instructions) stored in a memory of, and executing on a processor of, a network node or computer system such as those illustrated in FIG. 23C or FIG. 23D. That is, the method(s) illustrated in FIG. 15 may be implemented in the form of software (i.e., computer-executable instructions) stored in a memory of a network apparatus, such as the apparatus or computer system illustrated in FIG. 23C or FIG. 23D, which computer executable instructions, when executed by a processor of the node, perform the steps illustrated in FIG. 15. It is also understood that any transmitting and receiving steps illustrated in FIG. 15 may be performed by communication circuitry of the node under control of the processor of the node and the computer-executable instructions (e.g., software) that it executes.

FIG. 16 illustrates the operations of SAGS 1002 when an event occurs and SAGS 1002 needs to send an aggregated notification to NODS 1004. This procedure is required for the proposed architecture A or the proposed architecture B when SAGS 1002 and NODS 1004 are not co-located.

In Step 1 of FIG. 16, an event related to a subscribed-to-resource on the hosting node occurs.

In Step 2 of FIG. 16, as a result, SAGS 1002 needs to check if there is any subscription group related to this event and send aggregated notification to NODS 1004 if needed.

If the answer is YES, move to Step 3 of FIG. 16; otherwise, go to Step 8.

In Step 3 of FIG. 16, SAGS 1002 processes each found subscription group SG(i) to obtain the following information of SG(i).

The address of corresponding NODS 1004.

The identifier of URI of corresponding NG(i) if any which SAGS 1002 has previously configured in NODS 1004

The notification URIs of all subscription requests which SG(i) includes.

In Step 4 of FIG. 16, SAGS 1002 checks if SG(i) has a corresponding NG(i) being previously configured in NODS 1004.

If the answer is YES, go to Step 5 of FIG. 16; otherwise, go to Step 6 of FIG. 16.

In Step 5 of FIG. 16, SAGS 1002 sends an aggregated notification to the NODS 1004 associated with this SG(i). This message is destined to the identifier or URI of the corresponding NG(i). Then go to Step 7 of FIG. 16.

In Step 6 of FIG. 16, SAGS 1002 sends an aggregated notification to the NODS 1004 associated with this SG(i). Since SAGS 1002 did not configure a NG(i) in NODS 1004, this message will contain notification URIs of all subscription requests as included in SG(i).

Step 7 of FIG. 16, SAGS 1002 checks if SG(i) is the last subscription group which was found in Step 2 of FIG. 16.

If the answer is YES, it means all subscription groups found in Step 2 of FIG. 16 have been processed and move to Step 10 of FIG. 16; otherwise, go back to Step 3 of FIG. 16. Then go to Step 10 of FIG. 16.

Step 8 of FIG. 16, SAGS 1002 tries to find if there is any ungrouped subscription requests related to the event in Step 1 of FIG. 16.

If the answer is YES, moves to Step 9 of FIG. 16; otherwise, go to Step 10 of FIG. 6.

In Step 9 of FIG. 16, SAGS 1002 sends regular notification to subscribers associated with each subscription request found in Step 8 of FIG. 16.

Step 10 of FIG. 16, SAGS 1002 finishes processing the event occurred in Step 1.

It is understood that the entities performing the steps illustrated in FIG. 16 are logical entities that may be implemented in the form of software (i.e., computer-executable instructions) stored in a memory of, and executing on a processor of, a network node or computer system such as those illustrated in FIG. 23C or FIG. 23D. That is, the method(s) illustrated in FIG. 16 may be implemented in the form of software (i.e., computer-executable instructions) stored in a memory of a network apparatus, such as the apparatus or computer system illustrated in FIG. 23C or FIG. 23D, which computer executable instructions, when executed by a processor of the node, perform the steps illustrated in FIG. 16. It is also understood that any transmitting and receiving steps illustrated in FIG. 16 may be performed by communication circuitry of the node under control of the processor of the node and the computer-executable instructions (e.g., software) that it executes.

Figure 17:
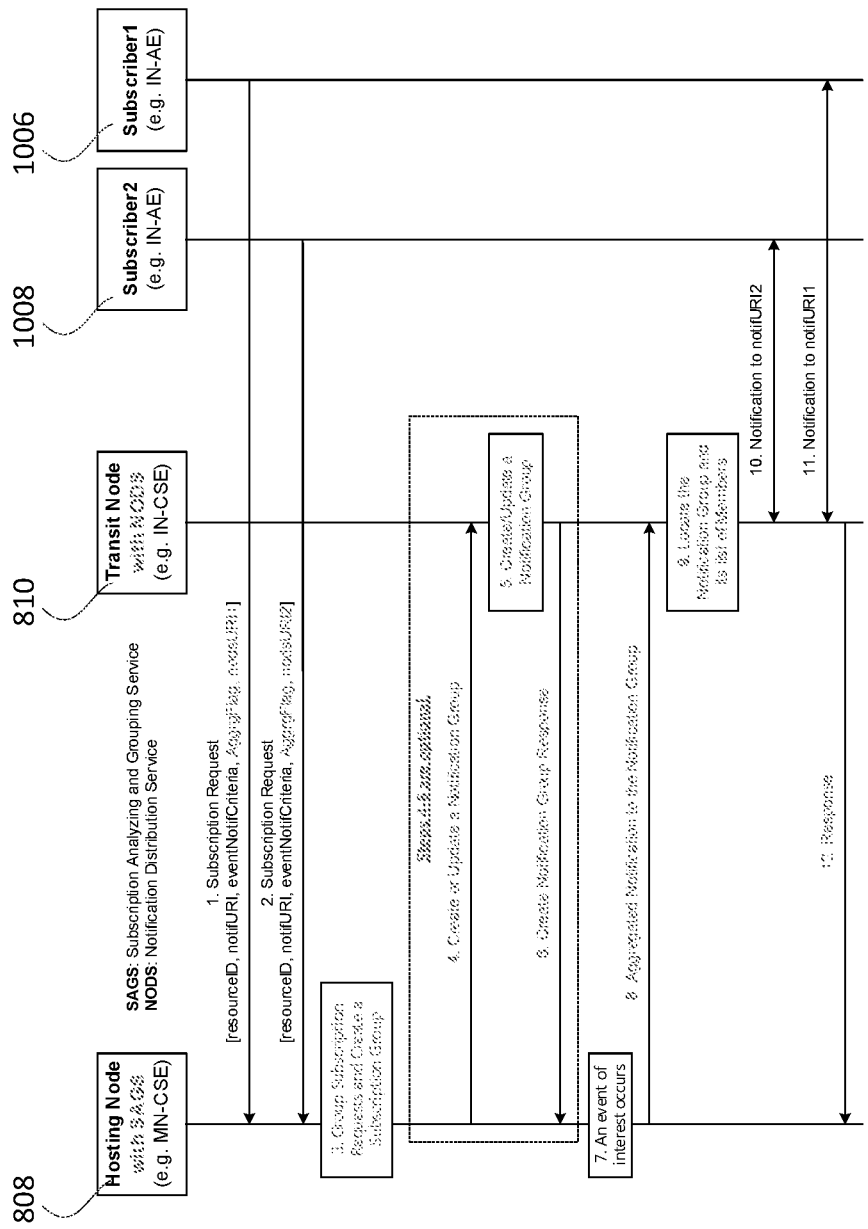
FIG. 17 is a Call Flow of a Procedure for Subscription Analyzing and Grouping at Hosting Node

In FIG. 17, multiple subscribers (e.g. M2M applications) make subscriptions to the same subscribed-to-resource at a hosting node (e.g. an M2M gateway). The hosting node has a SAGS 1002 which groups these subscriptions, configure notification group at NODS 1004 in a transit node 810, and in turn sends aggregated notifications to NODS 1004 in a transit node 810. NODS 1004 will eventually distribute separate notifications to each subscriber. The detailed procedures are described below:

In Step 1 of FIG. 17, Subscriber1 sends a subscription request to Hosting Node. This message may contain the following parameters:

resourceID: stands for identifier of subscribed-to-resource which Subscriber1 is making subscription to.

notifURI: stands for the URI or address which Subscriber1 wants the notification to be sent to.

eventNotifCriteria: stands for the condition to trigger sending a notification to notifURI aggrgFlag: indicates if this subscription request can be aggregated or not.

NODS 1004URI: stands for the URI of NODS 1004 which Subscriber1 wants the aggregated notification to be sent to. For example, Subscriber1 can set NODS 1004URI to its registrar CSE.

If aggrgFlag=FALSE, which means Subscriber1 does not want subscription aggregation and in turn NODS 1004URI may not be needed.

In Step 2 of FIG. 17, Subscriber 2 sends a subscription request to Hosting Node. The message contains the same parameters as the message in Step 1 of FIG. 17.

In Step 3 of FIG. 17, SAGS 1002 in the Hosting Node aggregates both subscription requests received in Step 1 and Step 3 since they have the same resourceID, the similar eventNotifCriteria, and the same NODS 1004URI. As a result, SAGS 1002 creates a subscription group for both requests.

Note that for ease of illustration, only two subscribers and two subscription requests are shown in FIG. 17. But SAGS 1002 can aggregate more subscribers and their subscription requests.

In Step 4 of FIG. 17, SAGS 1002 sends a message to NODS 1004 (note that the address of NODS 1004 was indicated in Step 1 of FIG. 17 and Step 2 of FIG. 17) to create or update a notification group in NODS 1004. The message may contain the following parameters.

notifURI1 contained in Step 1 of FIG. 17.
notifURI2 contained in Step 2 of FIG. 17.
Optionally the identifier of Subscriber1 and Subscriber2.

In Step 5 of FIG. 17, accordingly, NODS 1004 creates a notification group which has two members (i.e. notifURI1 and notifURI2 received in Step 1 and Step 2). NODS 1004 assigns an identifier to this notification group.

In Step 6 of FIG. 17, NODS 1004 sends the identifier of the created notification group to SAGS 1002.

In Step 7 of FIG. 17, An event meets the eventNotifCriteria in Step 1 and Step 2 occurs.

In Step 8 of FIG. 17, due the occurred event, SAGS 1002 sends an aggregated notification to NODS 1004. This message targets the notification group as received in Step 6. In other words, this message includes the identifier of targeted notification group.

Note that the address of NODS 1004 has been indicated in Step 1 and Step 2.

In Step 9 of FIG. 17, NODS 1004 locates the targeted notification group and its members (i.e. notifURI1 and notifURI2) as created in Step 5 of FIG. 17.

In Step 10 of FIG. 17, NODS 1004 forwards the aggregated notification to notifURI2.

In Step 11 of FIG. 17, NODS 1004 forwards the aggregated notification to notifURI1.

In Step 12 of FIG. 17, NODS 1004 sends a response to SAGS 1002 to inform it of the list of notifURIs (i.e. subscribers) which have successfully received the notification or the list of notifURIs (i.e. subscribers) which NODS 1004 does not successfully delivers the notification to.

There are few options or alternatives about FIG. 17.

Note1: Subscriber1 and Subscriber2 may send their subscription request via their registrar CSE (e.g. Transit node 810 in the figure). Optionally, both subscribers do not indicate NODS 1004URI in their subscription request, but the registrar CSE itself can insert its address as NODS 1004URI into each subscription request.

It is understood that the entities performing the steps illustrated in FIG. 17 are logical entities that may be implemented in the form of software (i.e., computer-executable instructions) stored in a memory of, and executing on a processor of, a network node or computer system such as those illustrated in FIG. 23C or FIG. 23D. That is, the method(s) illustrated in FIG. 17 may be implemented in the form of software (i.e., computer-executable instructions) stored in a memory of a network apparatus, such as the apparatus or computer system illustrated in FIG. 23C or FIG. 23D, which computer executable instructions, when executed by a processor of the node, perform the steps illustrated in FIG. 17. It is also understood that any transmitting and receiving steps illustrated in FIG. 17 may be performed by communication circuitry of the node under control of the processor of the node and the computer-executable instructions (e.g., software) that it executes.

TABLE 1

Format of Main Messages in FIG. 17

| Message Name | Sender | Receiver | Message Content |
| --- | --- | --- | --- |
| Subscription Request | Subscriber1 | Hosting Node | The identifier of subscribed-to-resource<br>The list of notification URIs<br>The event notification criterial<br>The aggrgFlag value<br>The NODS 1004URI value |
| Subscription Request | Subscriber2 | Hosting Node | The identifier of subscribed-to-resource<br>The list of notification URIs<br>The event notification criterial<br>The aggrgFlag value<br>The NODS 1004URI value |
| Create Notification Group | Hosting Node | Transit Node | The notification URI as indicated by each subscriber in their subscription requests being aggregated.<br>(Optional) The identifier of all subscribers being aggregated. |
| Create Notification Group Response | Transit Node | Hosting Node | The identifier of the notification group being created. |
| Aggregated Notification | Hosting Node | Transit Node | Case 1: If the hosting node creates a notification group at the transit node (i.e. NODS 1004)<br>The identifier of targeted notification group.<br>The payload describing the event and/or resource representation.<br>Case 2: If the hosting node does not creates a notification group at the transit node (i.e. NODS 1004)<br>The notification URI as indicated by each subscriber in their subscription requests being aggregated.<br>The payload describing the event and/or resource representation. |

Figure 18:
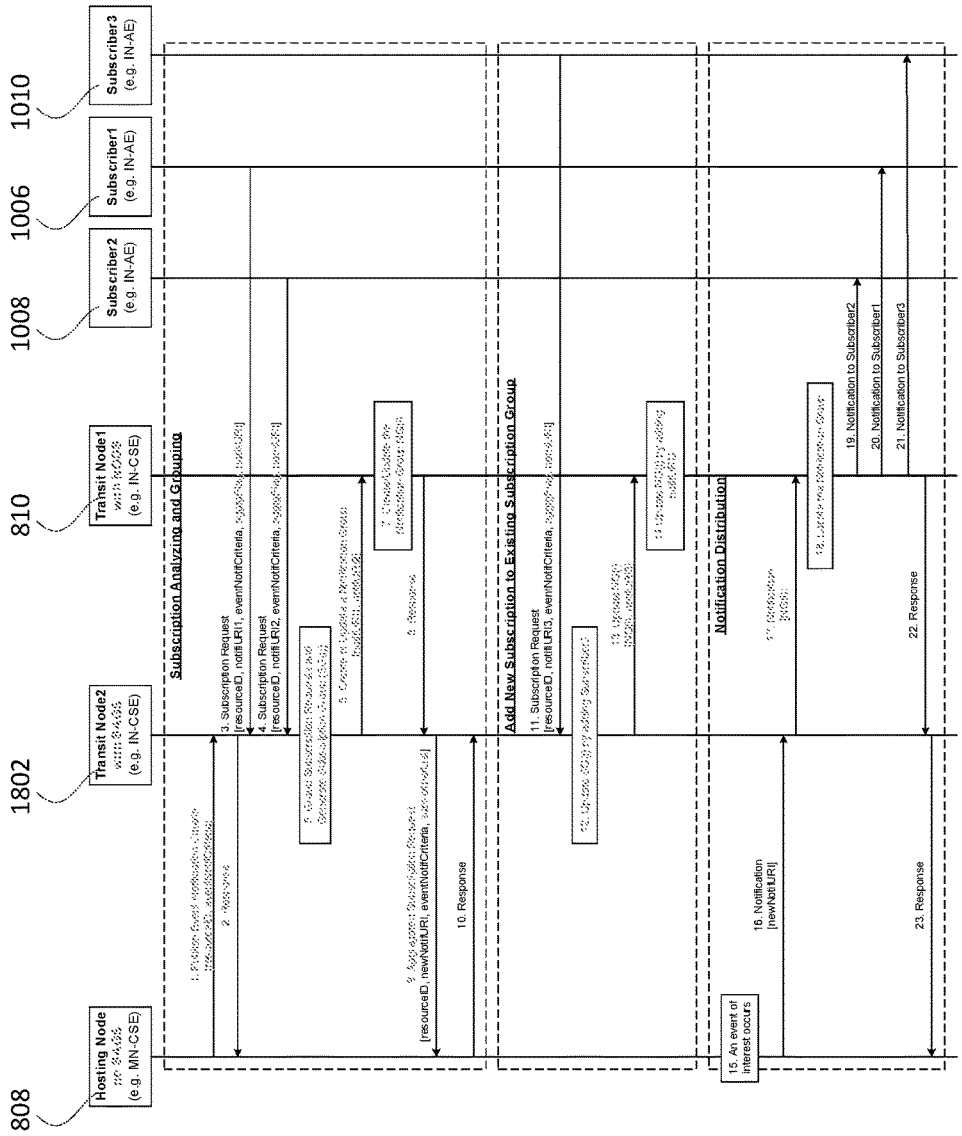
FIG. 18 is a Call Flow of a Procedure for Subscription Analyzing and Grouping at Transit Node

Subscription analyzing and grouping can also be performed at a transit node (e.g. Transit Node2 in FIG. 18). In this case, the transit node has both SAGS 1002 and NODS 1004. In order to facilitate subscription analyzing and grouping at the transit node, the hosting node may need to first publish its event notification criteria to the transit node. Then subscribers will make subscriptions according to those event notification criteria. The detailed procedures are described below which consists of three phases: subscription analyzing and grouping (i.e. Steps 1-10 of FIG. 18), add a new subscription to an existing subscription group (i.e. Steps 11-14 of FIG. 18), and notification distribution (i.e. Steps 15-23 of FIG. 18)

In Step 1 of FIG. 18, Hosting Node publishes its resources and associated event notification criteria to Transit Node2, which could be the registrar CSE of the Hosting Node. This message contains a list of following three parameters.

resourceID: the identifier of the source which can be subscribed.

eventNotifCriteria: the event notification criteria associated with the resource as denoted by resourceID.

whiteSubList: the list of subscribers which are allowed to make subscription to the resource as denoted by resourceID.

blackSubList: the list of subscribers which are not allowed to make subscription to the resource as denoted by resourceID.

Access control criteria for allowing or disallowing subscribers. Note that the access control criteria could be based on the location of subscribers, the service or application type of subscribers, etc.

In Step 2 of FIG. 18, Transit Node2 maintains the list of resourceID and its eventNotifCriteria. It sends a response back to Hosting Node.

In Step 3 of FIG. 18, Subscriber1 sends a subscription request to Transit Node2. Besides resourceID, notifURI, and eventNotifCriteria, this message could optionally contain two new parameters agggrgFlag and NODS 1004URI. Note that the destination of this message is Transit Node2.

aggrgFlag: a flag to indicate if Subscriber1 likes this subscription request to be aggregated (e.g. if aggrgFlag=TRUE) or not (e.g. if aggrgFlag=FALSE).

NODS URI stands for the URI of NODS 1004 which Subscriber1 wants the aggregated notification to be sent to. For example, Subscriber1 can set NODS 1004URI to its registrar CSE. This parameter is optional.

If aggrgFlag=FALSE, which means Subscriber1 does not want subscription aggregation and in turn NODS URI is not needed.

In Step 4 of FIG. 18, Subscriber2 sends a subscription request to Transit Node2. This message is similar to Step 3. Note that the destination of this message is Transit Node2.

In Step 5 of FIG. 18, SAGS 1002 in Transit Node2 finds that both requests in Step 3 and Step 4 can be aggregated (e.g. they have the same resourceID and eventNotifCriteria; and both are in the whiteSubList as received in Step 1). Then it aggregates both requests and creates a subscription group SG(i).

In Step 6 of FIG. 18, SAGS 1002 in Transit Node2 1802 sends a message to Transit Node1 810 which has NODS 1004 to create or update a notification group. This message contains notifURI1 (from Subscriber1 1006) and notifURI2 (from Subscriber2). Transit Node1 810 may be closer to subscribers or their notification receivers; as such it is more efficient for it to perform NODS 1004.

Note that SAGS 1002 and NODS 1004 could be co-located in the same transit node. For example, M2M network applications send subscription requests to their registrar M2M server. The registrar M2M server has both SAGS 1002 and NODS 1004. M2M network applications even do not need to indicate NODS 1004URI nor aggrgFlag; the registrar M2M server can aggregate their subscription requests.

Note that Transit Node1 may be selected by Transit Node2 which delegates its NODS 1004 to Transit Node1, for example, due to the high traffic load at Transit Node2 or Transit Node1 is closer to subscribers. Step 6 can perform such NODS 1004 delegation simultaneously and there is no need for additional messages.

In Step 7 of FIG. 18, NODS 1004 in Transit Node1 creates/updates the corresponding notification group NG(i). NG(i) has two members (i.e. notifURI1 and notifURI2).

In Step 8 of FIG. 18, NODS 1004 sends a response to SAGS 1002 to inform it the identifier of NG(i).

In Step 9 of FIG. 18, Transit Node2 1802 sends an aggregated subscription request to Hosting Node. This message may contain the following parameters, which are associated with SG(i). In addition, SAGS 1002 maintains the mapping relationship between SG(i) and NG(i).

resourceID: the identifier of resource which both Subscriber1 1006 and Subscriber2 1008 are interested.

eventNotifCriteria: the event notification criteria both Subscriber1 1006 and Subscriber2 1008 indicates.

newNotifURI: indicates the address which Hosting Node 808 should send the notification to. There are two options for Transit Node2 1802 to set this parameter.

Option 1: set newNotifURI to Transit Node2 or the identifier of SG(i) being created for Subscriber1 1006 and Subscriber2 1008. FIG. 18 shows this option.

Option 2: set newNotifURI to the address of NODS 1004 (i.e. NODS 1004URI). If this option is used, Step 16 will be directly from Hosting Node 808 to NODS 1004.

subscriberList: the list of original subscribers included in SG(i). This parameter is optional.

In Step 10 of FIG. 18, Hosting Node sends a response back to Transit Node2.

If subscriberList is included in Step 9 of FIG. 18, Hosting Node may disapprove some subscribers. If that happens, SAGS 1002 in Transit Node2 will repeat Step 6-8 of FIG. 18 to update NG(i) in NODS 1004.

In Step 11 of FIG. 18, Another Subscriber3 makes subscription request, which is similar to Step 3 and Step 4.

In Step 12 of FIG. 18, SAGS 1002 finds this request can be aggregated to SG(i) (e.g. with the same resourceID and the same eventNotifCriteria). As a result, it adds Subscriber3 to SG(i).

In Step 13 of FIG. 18, SAGS 1002 sends a message to update NODS 1004 with Subscriber3's notifURI3.

In Step 14 of FIG. 18, NODS 1004 adds notifURI3 to NG(i) as a new member.

In Step 15 of FIG. 18, an event corresponding to eventNotifCriteria in Step 3/4/11 occurs.

In Step 16 of FIG. 18, Hosting Node 808 sends a notification to newNotifURI which was indicated in Step 9.

In Step 17 of FIG. 18, Transit Node2 receives this notification and forwards the notification to NG(i).

In Step 18 of FIG. 18, NODS 1004 in Transit Node1 810 receives the notification. It finds out this notification targets NG(i) and as a result, it distributes the notification to all members of NG(i) (i.e. notifURI1, notifURI2, and notifURI3).

In Step 19-21 of FIG. 18: NODS 1004 distributes the notification to three subscribers, respectively.

It is not shown in the figure, but each subscriber could send a response back to NODS 1004 to acknowledge the receipt of the notification. In the response message to NODS 1004, each subscriber could also indicate a new notifURI for receiving future notifications.

In Step 22 of FIG. 18, NODS 1004 sends a response to SAGS 1002 to inform it which original subscriber has successfully received the notification.

In Step 23 of FIG. 18, SAGS 1002 sends a response back to the hosting node.

It is understood that the entities performing the steps illustrated in FIG. 18 are logical entities that may be implemented in the form of software (i.e., computer-executable instructions) stored in a memory of, and executing on a processor of, a network node or computer system such as those illustrated in FIG. 23C or FIG. 23D. That is, the method(s) illustrated in FIG. 18 may be implemented in the form of software (i.e., computer-executable instructions) stored in a memory of a network apparatus, such as the apparatus or computer system illustrated in FIG. 23C or FIG. 23D, which computer executable instructions, when executed by a processor of the node, perform the steps illustrated in FIG. 18. It is also understood that any transmitting and receiving steps illustrated in FIG. 18 may be performed by communication circuitry of the node under control of the processor of the node and the computer-executable instructions (e.g., software) that it executes.

TABLE 2

Format of Main Messages in FIG. 18

| Message Name | Sender | Receiver | Message Content |
| --- | --- | --- | --- |
| Publish Event Notification Criteria | Hosting Node | Transit Node2 | The identifier of a resource which can be subscribed<br>The event notification criterial associated with this resource.<br>The list of subscribers which are allowed to make subscription to the resource<br>the list of subscribers which are not allowed to make subscription to the resource |
| Subscription Request | Subscriber1 | Transit Node2 | The identifier of subscribed-to-resource<br>The list of notification URIs<br>The event notification criterial<br>The aggrgFlag value<br>The NODS 1004URI value |
| Subscription Request | Subscriber2 | Transit Node2 | The identifier of subscribed-to-resource<br>The list of notification URIs<br>The event notification criterial<br>The aggrgFlag value<br>The NODS 1004URI value |
| Create Notification Group | Transit Node2 | Transit Node1 | The notification URI as indicated by each subscriber in their subscription requests being aggregated.<br>(Optional) The identifier of all subscribers being aggregated. |
| Create Notification Group Response | Transit Node1 | Transit Node2 | The identifier of the notification group being created. |
| Aggregated Subscription Request | Transit Node2 | Hosting Node1 | The identifier of subscribed-to-resource<br>The list of notification URIs<br>The event notification criterial<br>(Optional) The list of original subscribers |
| Update NG(i) | Transit Node2 | Transit Node1 | The identifier of an existing notification group<br>The notification URI as indicated by the new subscriber |
| Notification | Transit Node2 | Transit Node1 | Case 1: If the Transit Node2 creates a notification group at the Transit Node1 (i.e. NODS 1004)<br>The identifier of targeted notification group.<br>The payload describing the event and/or resource representation.<br>Case 2: If the Transit Node2 does not create a notification group at the Transit Node1 (i.e. NODS 1004)<br>The notification URI as indicated by each subscriber in their subscription requests being aggregated.<br>The payload describing the event and/or resource representation |

Figure 19:
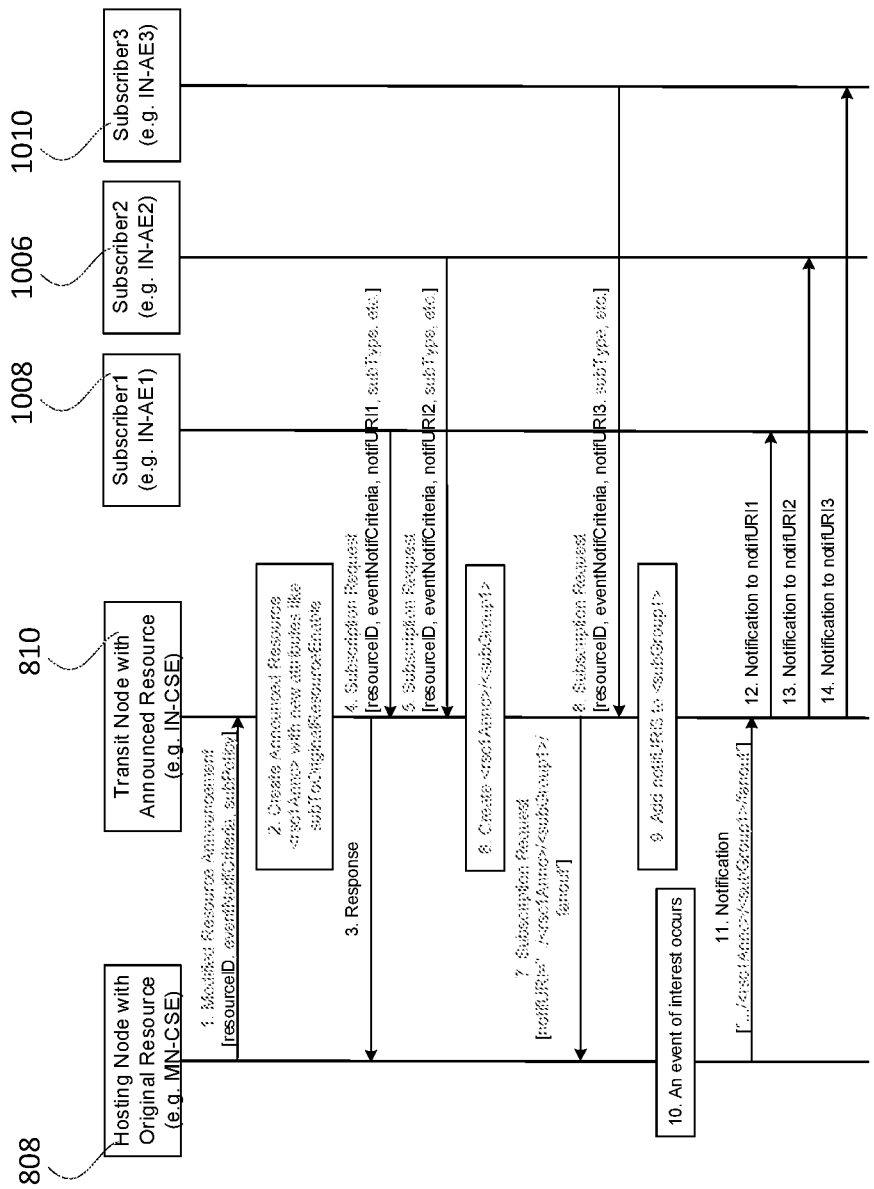
FIG. 19 is a Call Flow of a Subscription via Announced Resources

In existing oneM2M, each announced resource has a corresponding original resource and announced resources can be subscribed. In other words, an M2M entity can issue a subscription request to an announced resource to get notifications about the changes to the announced resource. But this request cannot get notification about events or changes to the original resource. FIG. 19 shows a case where an M2M entity sends a subscription request to an announced resource but intent is to get future notifications about changes to the original resource.

In Step 1 of FIG. 19: Host Node 808 sends a modified resource announcement message to Transit Node. Besides the identifier of original resource (i.e. resourceID), this message contains the following new parameters for facilitating subscription in Step 4 of FIG. 19. These new parameters will be added as new attributes for the announced resource to be created in Step 2 of FIG. 19.

eventNotifCriteria: stand for event notification criteria of the resource being announced.

subPolicy: stand for the subscription policies to the resource being announced (e.g. whiteSubList and blackSubList as defined in previous section).

subToOriginalResourceEnable: Only if this parameter is TRUE, the original resource can be subscribed via its announced resource to be created in Step 2 of FIG. 19 at Transit Node.

In Step 2 of FIG. 19: Transit Node creates a corresponding announced resource (e.g. <rsc1Annc>). This resource has three new attributes subToOriginalResourceEnable, subPolicy, eventNotifCriteria, as conveyed in Step 1 of FIG. 19.

If subToOriginalResourceEnable=TURE, subscribers can make subscription to original resource via this announced resource (e.g. Step 4, Step 5, and Step 8)

In Step 3 of FIG. 19, Transit Node sends a response back to Hosting Node.

In Step 4 of FIG. 19, Subscriber1 sends a subscription request to Transit Node. This message contains the following parameters.

resourceID: set to <rsc1Annc> as an example. It means the subscription request targets this announced resource (when subType=ANNOUNCE) or its original resource (when subType=ORIGINAL).

eventNotifCriteria: indicate the event notification criteria associated with this subscription. This parameter is a subset of "eventNotifCriteria" contained in Step 1 of FIG. 19.

subType: indicate if the subscriber is interested in the changes of original resource (when subType=ORIGINAL) or the changes of the announced resource (when subType=ANNOUNCE).

notifURI1: indicate the address which Subscriber1 expects to receive future notifications from.

In Step 5 of FIG. 19, Subscriber2 1008 sends a subscription request to Transit Node 810. This message is similar to Step 4 of FIG. 19.

In Step 6 of FIG. 19, Transit Node uses subPolicy received in Step 1 of FIG. 19 to determine if the subscription request from Subscriber1 1006 and Subscriber2 1008 should be approved (e.g. both Subscriber1 1006 and Subscriber2 1008 are in the whiteSubList). In this example, it approves both requests. Then Transit Node finds that requests in Step 4 and Step 5 of FIG. 19 have the same resourceID and eventNotifCriteria. Then it creates a subscription group as a child resource of the announced resource (i.e. <rsc1Annc>/<subGroup1>). <subGroup1> has two members (i.e. notifURI1 and notifURI2 as received in Step 4 and Step 5 of FIG. 19) and a virtual resource "fanout". The virtual resource "fanout" will be used to trigger to distribute notification to each member of <subGroup1>.

In Step 7 of FIG. 19, Transit Node sends a regular subscription request to Hosting Node with the following parameters.

resourceID: set to the same resourceID in Step 4 and Step 5 of FIG. 19.

eventNotifCriteria: set to the same eventNotifCriteria in Step 4 and Step 5 of FIG. 19.

notifURI: set to "<rsc1Annc>/<subGroup1>/fanout".

In Step 8 of FIG. 19, Subscriber3 1010 sends a subscription request to Transit Node. This message is similar to Step 4 of FIG. 19 but with a different notifURI3.

In Step 9 of FIG. 19, Transit Node finds the request in Step 8 of FIG. 19 is similar to those in Step 4 and Step 5 of FIG. 19. As a result, it adds notifURI3 to <subGroup1>. But since Transit Node 810 already sent a subscription request to Hosting Node 808 in Step 7 of FIG. 19, it will not send a request again and thus save message overhead between it and Hosting Node 808.

In Step 10 of FIG. 19, An event corresponding to eventNotifCriteria in Step 7 occurs.

In Step 11 of FIG. 19, Hosting Node 808 sends a notification to "<rsc1Annc>/<subGroup1>/fanout" at Transit Node 810. The keyword "fanout" is used to trigger Transit Node 810 to distribute the notification to each member of <subGroup1> (i.e. notifURI1, notifURI2, and notifURI3).

In Step 12 of FIG. 19, Transit Node 810 forwards the notification to notifURI1.

In Step 13 of FIG. 19, Transit Node 810 forwards the notification to notifURI2.

In Step 14 of FIG. 19, Transit Node 810 forwards the notification to notifURI3.

It is understood that the entities performing the steps illustrated in FIG. 19 are logical entities that may be implemented in the form of software (i.e., computer-executable instructions) stored in a memory of, and executing on a processor of, a network node or computer system such as those illustrated in FIG. 23C or FIG. 23D. That is, the method(s) illustrated in FIG. 19 may be implemented in the form of software (i.e., computer-executable instructions) stored in a memory of a network apparatus, such as the apparatus or computer system illustrated in FIG. 23C or FIG. 23D, which computer executable instructions, when executed by a processor of the node, perform the steps illustrated in FIG. 19. It is also understood that any transmitting and receiving steps illustrated in FIG. 19 may be performed by communication circuitry of the node under control of the processor of the node and the computer-executable instructions (e.g., software) that it executes.

As mentioned above, existing oneM2M describes a mechanism (referred to as Announcement Synchronization) which enables the synchronization between the original attributes and announced attributes. But it does not give details on how to implement such Announcement Synchronization. Taking the configuration in FIG. 19 as an example, we could intergrate Announcement Synchronization together with resource subscription.

In step 1 of an alternate embodiment, Hosting Node (e.g. MN-CSE) announces its resource (i.e. original resource) to Transit Node (e.g. IN-CSE).

In step 2 of an alternate embodiment, Transit Node 810 creates corresponding announced resource.

In step 3 of an alternate embodiment, Subscriber 1 1006 (e.g. IN-AE1) subscribes to the announced resource on Transit Node.

In step 4 of an alternate embodiment, Hosting Node 808 maintains synchronization between its original resource and the announce resource. In other words, Hosting Node 808 can send notification to Transit Node 810 whenever there is a change to the original resource so that the announce resource will keep synchronized with the original resource.

In step 5 of an alternate embodiment, Transit Node 810 updates the announced resource based on the notification received from Hosting Node 808. Then it uses its latest value to serve the subscription from Subscriber 1 1006. For example, if the new value of the announced resource meets the event notification criteria indicated by Subscriber 1 1006, Transit Node 810 will sends a notification to Subscriber 1 1006.

However, such Announcement Synchronization has some disadvantages or drawbacks compared to the solution presented in FIG. 19.

First, oneM2M specification does not give details on how such Announcement Synchronization will be implemented.

Second, oneM2M specification says "Synchronization between the attributes announced by the original resource and the announced resource is the responsibility of the original resource Hosting CSE.". It implies that Hosting CSE determines how Announcement Synchronization will be performed. Thus, it is independent of resource subscription. In other words, resource subscription to the announced resource is independent of and will not be impacted by Announcement Synchronization.

Such Announcement Synchronization will need Hosting CSE 810 keep sending notification to Transit Node 808 even though the new value of original resource is not interested by any subscriber. Compared to the solution presented in FIG. 19, Such Announcement Synchronization causes more notifications and overhead between Hosting CSE 810 and Transit CSE.

Some subscribers may be interested in events (e.g. there is an UPDATE operation on the original resource). To solely use Announcement Synchronization cannot achieve this goal, because Announcement Synchronization does not report such events to the announced resource.

TABLE 3

Format of Main Messages in FIG. 19

| Message Name | Sender | Receiver | Message Content |
|---|---|---|---|
| Modified Resource Announcement | Hosting Node | Transit Node | The identifier of a resource being announced<br>The event notification criterial associated with this resource.<br>The subToOriginalResourceEnable value<br>Subscription policies to this resource such as: the list of subscribers which are allowed to make subscription to the resource, and/or the list of subscribers which are not allowed to make subscription to the resource |
| Subscription Request | Subscriber1 | Transit Node | The identifier of subscribed-to-resource<br>The list of notification URIs<br>The event notification criterial<br>The subType value |
| Subscription Request | Subscriber2 | Transit Node | The identifier of subscribed-to-resource<br>The list of notification URIs<br>The event notification criterial<br>The subType value |
| Subscription Request | Subscriber3 | Transit Node | The identifier of subscribed-to-resource<br>The list of notification URIs<br>The event notification criterial<br>The subType value |

Three new attributes are proposed for existing oneM2M <subscription> resource as listed in Table 4.

TABLE 4

New Attributes of <subscription> Resource

| Attributes of <subscription> | Multiplicity | RW/RO/WO | Description |
|---|---|---|---|
| aggrgFlag | 1 | RO | This attribute indicates if the subscription request denoted by <subscription> can be aggregated or not. This attribute is only configured when this <subscription> is created via CREATE operation. If aggrgFlag is TRUE, it means this <subscription> can be aggregated; otherwise it cannot be aggregated if aggrgFlag is FALSE. If this attribute does not appear in CREATE operation of <subscription>, this <subscription> could be either aggregated or not. |
| subType | 1 | RO | This attribute indicates if this <subscription> is made to announced resource or original resource. If subType is ANNOUNCE, it means this <subscription> is only for announced resource; if subType is ORIGINAL, this <subscription> is for the original resource. This attribute is only used if this <subscription> being created is a sub-resource of an announced resource. |

TABLE 4-continued

New Attributes of <subscription> Resource

| Attributes of <subscription> | Multiplicity | RW/ RO/WO | Description |
| --- | --- | --- | --- |
| NODS 1004 URI | 0 . . . 1 | RW | This attribute indicates the address of NODS 1004 which is responsible for distributing aggregated notification to original subscribers. This attribute is optional. |
| eventNotificationCriterionID | 1 | RW | This attribute indicates the identifier of an existing event notification criterion, which will be applied to this <subscription> resource. Note that as proposed in Table 6, each resource has a new attribute eventNotificationCriteria which includes a list of event notification criteria. |

Three new attributes are proposed for existing oneM2M announced resource as listed in Table 5.

TABLE 5

New Universal Attributes for Announced Resources

| Attributes Name | Multiplicity | RW/ RO/ WO | Description |
| --- | --- | --- | --- |
| subToOriginalResourceEnable | 1 | RW | This attribute indicates if it is allowed to create a <subscription> resource under this announced resource but the <subscription> is for potential changes on the original resource. This feature will be enabled if this attribute is TRUE and disabled is this attribute is FALSE. |
| subPolicy | 1 | RW | This attribute indicates subscription policies to the original resource as denoted by this announced resource. For example it could include a whiteSubList (i.e. the list of subscribers which are allowed to make subscription to the original resource) and/or a backSubList (i.e. the list of subscribers which are not allowed to make subscription to the original resource). |
| eventNotificationCriteria | 0 . . . 1 (L) | RW | This attribute indicates a list of event notification criteria being defined and allowed for the original resource of this announced resource. This attribute is the same as <subscription>'s sub-resource eventNotificationCriteria in oneM2M. |

A new common attribute is proposed for any resource which can be subscribed by subscribers (Table 6).

TABLE 6

New Common Attributes

| Attributes Name | Multiplicity | RW/ RO/ WO | Description |
| --- | --- | --- | --- |
| eventNotificationCriteria | 0 . . . 1 (L) | RW | This attribute indicates a list of event notification criteria being defined and allowed for this a resource. In other words, a subscriber which makes subscription to this resource has to follow the event notification criteria defined by this attribute. Each event notification criterion in this list has an identifier, which can be used or referred by a <subscription> resource. For doing this, a new attribute "eventNotificationCriterionID" is introduced to <subscription> resource, which can replace its sub-resource "eventNotificationCriteria". |

As discussed above, the aggregated notification from SAGS 1002 to NODS 1004 could include all notifURI to each original subscriber. To support this feature, it's proposed that existing oneM2M notification message includes the following parameter/information when the notification is an aggregated notification being sent from SAGS 1002 to NODS 1004.

notifURIList: indicates the list of notifURI to each original subscriber. In other words, each item in this list is a notifURI to a different subscriber. When NODS 1004 receives the aggregation notification from SAGS 1002, it will extract all notifURIs contained in this parameter and distribute the notification to each notifURI.

When a subscriber receives a notification message, it needs to send back a response. It is proposed that this notification response message contain a new parameter notifURI. The new notifURI basically tells the hosting node (or transit node) the address for receiving future notifications.

Figure 20:
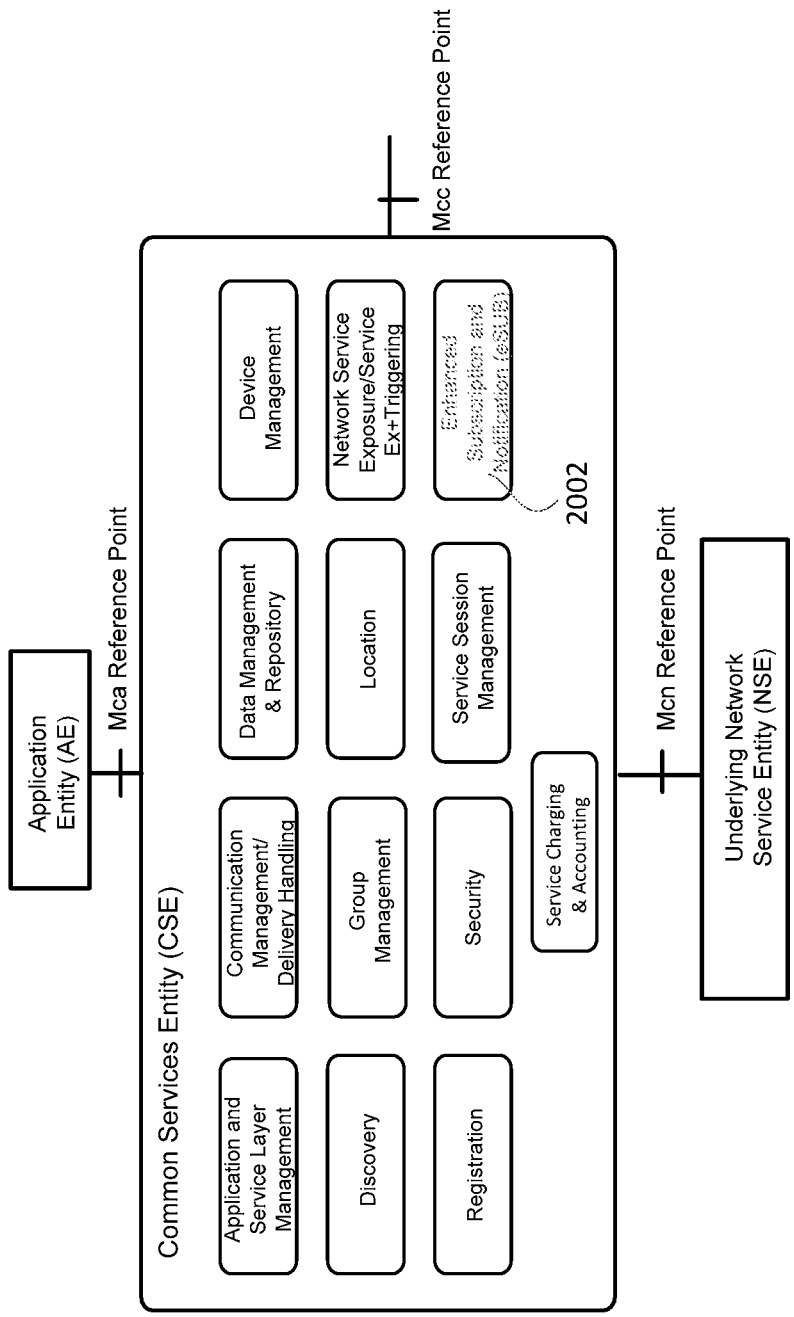
FIG. 20 is a diagram of New Enhanced Subscription and Notification (eSUB) CSF into oneM2M ROA

FIG. 20 shows one exemplary embodiment for implementing the proposed ideas to existing SUB CSF to form an Enhanced Subscription and Notification (eSUB) CSF 2002 based on the current oneM2M functional architecture.

This new eSUB 2002 supports the proposed SAGS 1002 and/or NODS 1004 service. It also supports subscription via announced resources. eSUB 2002 can be residing in IN-CSE, MN-CSE, and/or ASN-CSE. FIG. 21 illustrates two exemplary deployments of eSUB 2002 in oneM2M, where the proposed eSUB will impact messaging interactions on Mcc and Mca reference points.

Figure 21A:
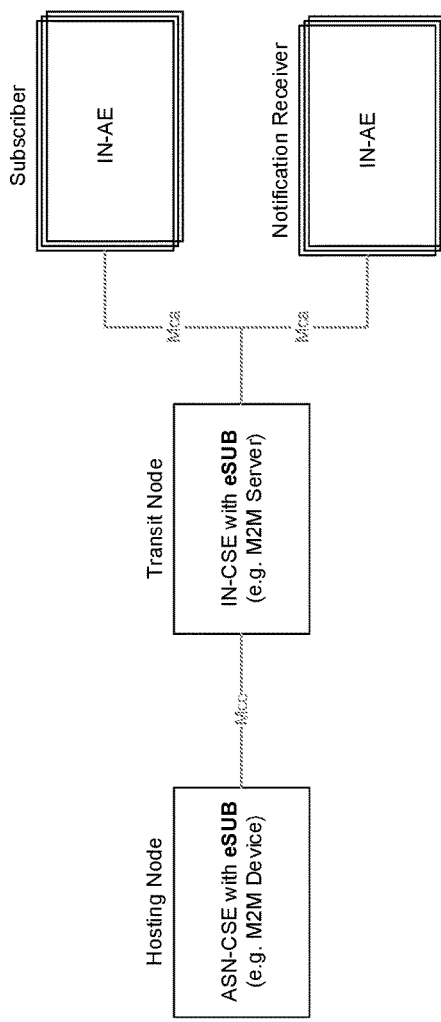
FIG. 21 is a diagram of Deployment of New eSUB in oneM2M

In FIG. 21A, the subscriber is IN-AEs, the hosting node is MN-CSE, and the transit node is IN-CSE which is the registar CSE of IN-AEs. eSUB 2002 is included in both MN-CSE and IN-CSE. The eSUB in MN-CSE only supports SAGS 1002, while eSUB in IN-CSE could support both SAGS 1002 and NODS 1004. Notification receiver is IN-AEs.

Figure 21B:
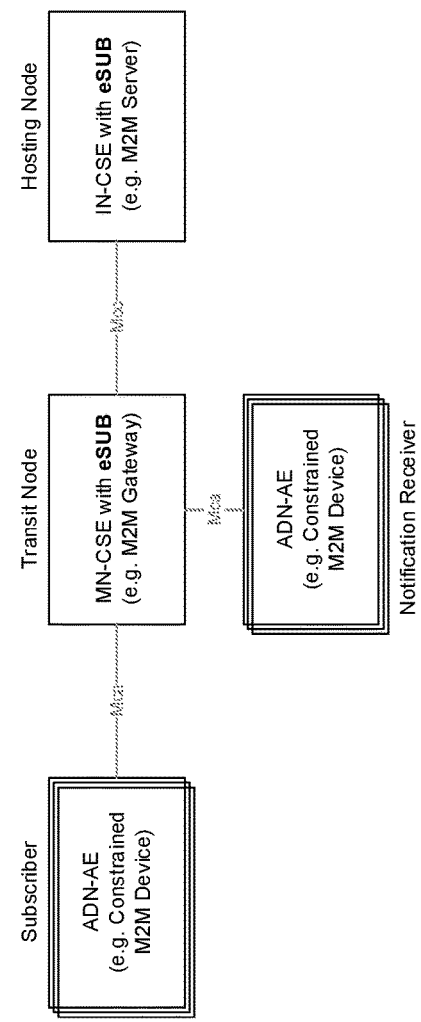

In FIG. 21B, the subscriber is ADN-AEs, the hosting node is IN-CSE, and the transit node is MN-CSE which is the registar CSE of ADN-AEs. IN-CSE is the registrar CSE of MN-CSE. eSUB is included in both MN-CSE and IN-CSE. The eSUB in IN-CSE only supports SAGS 1002, while eSUB in MN-CSE could support both SAGS 1002 and NODS 1004. Notification receiver is ADN-AEs.

It is understood that the functionality illustrated in FIGS. 20-21 may be implemented in the form of software (i.e., computer-executable instructions) stored in a memory of, and executing on a processor of, an apparatus of an M2M network (e.g., a server, gateway, device, or other computer system), such as one of those illustrated in FIG. 23C or 23D described below.

Figure 22:
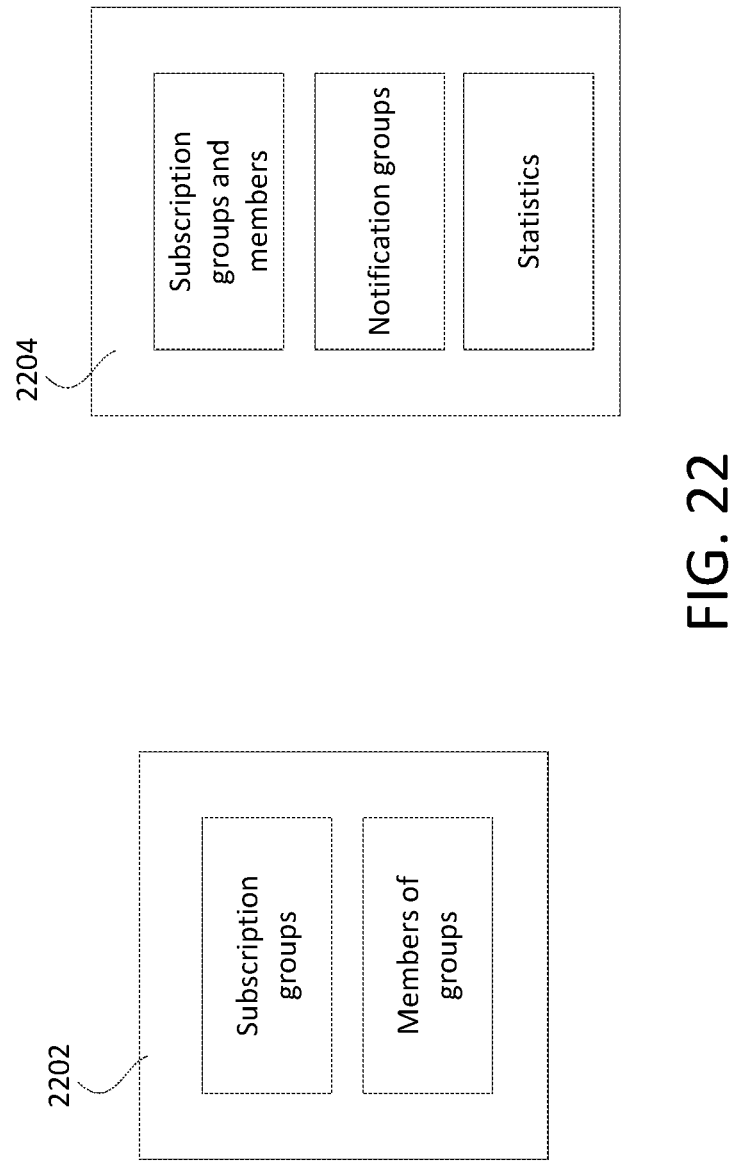
FIG. 22 is a diagram of Graphical User Interfaces (GUI) of one embodiment.

Interfaces, such as Graphical User Interfaces (GUIs), can be used for displaying and/or adjusting parameters and/or resulted related to subscription aggregation. FIG. 22 is a diagram that illustrates an interfaces 2202 and 2204.

A user interface 2202 can be added to hosting node (e.g. an M2M Gateway) to display information related to subscription aggregation such as subscription groups being created by SAGS 1002 and the members of each group.

A user interface 2204 can also be added to transit node (e.g. an M2M Server) to display information related to subscription aggregation and notification distribution such as:
  Subscription groups and its members being created by SAGS 1002
  Notification groups and its members being created by NODS 1004
  Statistics about each notification group (e.g. how many notifications being successfully distributed to each member).

It is to be understood that interfaces 2202 and 2204 can be produced using displays such as those shown in FIGS. 23C-D described below.

Example M2M/IoT/WoT Communication System

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

The term "service layer" refers to a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a-service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities FIG. 23A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as CSE 202, M2M server 602, 708, transit node 810 and 1802, host node 808, M2M AE 802, 804, and 806, SAGS 1002, NODS 1004 1004, Subscribers 1006, 1008, and 1010, CSFs including eSUB CSF 2002 and logical entities to produce interfaces 2202 and 2204.

As shown in FIG. 23A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 23A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 23B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as CSE 202, M2M server 602, 708, transit node 810 and 1802, host node 808, M2M AE 802, 804, and 806, SAGS 1002, NODS 1004 1004, Subscribers 1006, 1008, and 1010, CSFs including eSUB CSF 2002 and logical entities to produce interfaces 2202 and 2204. The M2M service layer 22 may be implemented by one or more servers, computers, devices, virtual machines (e.g. cloud/storage farms, etc.) or the like, including for example the devices illustrated in FIGS. 23C and 23D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 23B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through network 12 in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as CSE 202, M2M server 602, 708, transit node 810 and 1802, host node 808, M2M AE 802, 804, and 806, SAGS 1002, NODS 1004 1004, Subscribers 1006, 1008, and 1010, CSFs including eSUB CSF 2002 and logical entities to produce interfaces 2202 and 2204 may be hosted within a M2M service layer instance hosted by an M2M node, such as an M2M server, M2M gateway, or M2M device, as shown in FIG. 23B. For example, the logical entities such as CSE 202, M2M server 602, 708, transit node 810 and 1802, host node 808, M2M AE 802, 804, and 806, SAGS 1002, NODS 1004 1004, Subscribers 1006, 1008, and 1010, CSFs including eSUB CSF 2002 and logical entities to produce interfaces 2202 and 2204 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 23C or FIG. 23D described below.

Further, logical entities such as CSE 202, M2M server 602, 708, transit node 810 and 1802, host node 808, M2M AE 802, 804, and 806, SAGS 1002, NODS 1004 1004, Subscribers 1006, 1008, and 1010, CSFs including eSUB CSF 2002 and logical entities to produce interfaces 2202 and 2204 can be implemented as part of an M2M network that uses a Service Oriented Architecture (SOA) and/or a Resource-Oriented Architecture (ROA) to access services of the present application.

FIG. 23C is a block diagram of an example hardware/software architecture of a M2M network node 30, such as an M2M device 18, an M2M gateway 14, an M2M server, or the like. The node 30 can execute or include logical entities such as CSE 202, M2M server 602, 708, transit node 810 and 1802, host node 808, M2M AE 802, 804, and 806, SAGS 1002, NODS 1004 1004, Subscribers 1006, 1008, and 1010, CSFs including eSUB CSF 2002 and logical entities to produce interfaces 2202 and 2204. The device 30 can be part of an M2M network as shown in FIG. 23A-B or part of a non-M2M network. As shown in FIG. 23C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 23C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 23C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 23C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 23D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as CSE 202, M2M server 602, 708, transit node 810 and 1802, host node 808, M2M AE 802, 804, and 806, SAGS 1002, NODS 1004 1004, Subscribers 1006, 1008, and 1010, CSFs including eSUB CSF 2002 and logical entities to produce interfaces 2202 and 2204. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 23A and FIG. 23B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIGS. 23 A-B or the device 30 of FIG. 23 C.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as CSE 202, M2M server 602, 708, transit node 810 and 1802, host node 808, M2M AE 802, 804, and 806, SAGS 1002, NODS 1004 1004, Subscribers 1006, 1008, and 1010, CSFs including eSUB CSF 2002 and logical entities to produce interfaces 2202 and 2204 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus comprising a processor and a memory, the apparatus further including computer-executable instructions stored in the memory of the apparatus which, when executed by the processor of the apparatus, cause the apparatus to:
   receive, from a first subscriber device, a first request to subscribe to a resource, wherein the first request includes a first identifier of the first subscriber device;
   receive, from a second subscriber device, a second request to subscribe to the resource, wherein the second request includes a second identifier of the second subscriber device;
   send, to a node hosting the resource, the first request and the second request;
   receive, from the node, an aggregated notification of a resource update, wherein the aggregated notification includes an indication that the notification should be distributed to the first subscriber device and the second subscriber device; and
   send a notification of the resource update to the first subscriber device and a notification of the resource update to the second subscriber device based on receiving the indication.

2. The apparatus of claim 1, the apparatus including computer-executable instructions stored in the memory of the apparatus which, when executed by the processor of the apparatus, further cause the apparatus to:
   receive, from the node, configuration information assigning the first subscriber device and the second subscriber device to a group; and
   receive the aggregated notification, wherein the indication comprises a reference to the group.

3. The apparatus of claim 2, the apparatus including computer-executable instructions stored in the memory of the apparatus which, when executed by the processor of the apparatus, further cause the apparatus to:
   in response to receiving the configuration information, create a group comprising the first subscriber device identifier and the second subscriber device identifier;
   generate an identifier for the group; and
   send the identifier to the node.

4. The apparatus of claim 1, wherein the apparatus includes an announced resource linking to the resource at the node.

5. The apparatus of claim 4, wherein the first request to subscribe to the resource comprises a request to subscribe to the announced resource.

6. The apparatus of claim 5, wherein the notification of the resource update comprises a notification of an update to the resource at the node.

7. The apparatus of claim 1, wherein the first request and the second request comprise a same notification criteria.

8. The apparatus of claim 1, wherein the first request and the second request comprise different notification criteria.

9. An apparatus comprising a processor and a memory, the apparatus further including computer-executable instructions stored in the memory of the apparatus which, when executed by the processor of the apparatus, cause the apparatus to:
- receive, from a first subscriber device, a first request to subscribe to a resource, wherein the first request includes a first identifier of the first subscriber device;
- receive, from a second subscriber device, a second request to subscribe to the resource, wherein the second request includes a second identifier of the second subscriber device;
- send, to a node hosting the resource, the first request and the second request;
- receive, from the node, an aggregated notification of a resource update;
- determine a notification of the resource update should be distributed at least to the first subscriber device and the second subscriber device; and
- send the notification of the resource update to the first subscriber device and the second subscriber device based on the determining.

10. The apparatus of claim 9, the apparatus including computer-executable instructions stored in the memory of the apparatus which, when executed by the processor of the apparatus, further cause the apparatus to:
- receive, from the node, configuration information assigning the first subscriber device and the second subscriber device to a group; and
- determine the notification of the resource update should be distributed at least to the first subscriber device and the second subscriber device based on the assigning to the group.

11. The apparatus of claim 10, the apparatus including computer-executable instructions stored in the memory of the apparatus which, when executed by the processor of the apparatus, further cause the apparatus to:
- in response to receiving the configuration information, create a group comprising the first subscriber device identifier and the second subscriber device identifier;
- generate an identifier for the group; and
- send the identifier to the node.

12. The apparatus of claim 9, wherein the apparatus includes an announced resource linking to the resource at the node.

13. The apparatus of claim 12, wherein the first request to subscribe to the resource comprises a request to subscribe to the announced resource.

14. The apparatus of claim 13 wherein the notification of the resource update comprises a notification of an update to the resource at the node.

15. The apparatus of claim 9, wherein the first request and the second request comprise different notification criteria.

16. A method comprising:
- receiving, from a first subscriber device, a first request to subscribe to a resource, wherein the first request includes a first identifier of the first subscriber device;
- receiving, from a second subscriber device, a second request to subscribe to the resource, wherein the second request includes a second identifier of the second subscriber device;
- sending, to a node hosting the resource, the first request and the second request;
- receiving, from the node, an aggregated notification of a resource update, wherein the aggregated notification includes an indication that the notification should be distributed to the first subscriber device and the second subscriber device; and
- sending a notification of the resource update to the first subscriber device and a notification of the resource update to the second subscriber device based on receiving the indication.

17. The method of claim 16, further comprising:
- receiving, from the node, configuration information assigning the first subscriber device and the second subscriber device to a group; and
receiving the aggregated notification, wherein the indication comprises a reference to the group.

18. The method of claim 16, further comprising:
- in response to receiving the configuration information, creating a group comprising the first subscriber device identifier and the second subscriber device identifier;
- generating an identifier for the group; and
sending the identifier to the node.

19. The method of claim 16, further comprising:
- hosting an announced resource linking to the resource at the node.

20. The method of claim 19, wherein the first request to subscribe to the resource comprises a request to subscribe to the announced resource.

21. The method of claim 20, wherein the notification of the resource update comprises a notification of an update to the resource at the node.

22. The method of claim 16, wherein the first request and the second request comprise different notification criteria.

* * * * *